(12) United States Patent
Shin et al.

(10) Patent No.: US 12,470,349 B2
(45) Date of Patent: *Nov. 11, 2025

(54) METHOD AND APPARATUS FOR CONFIGURING DEMODULATION REFERENCE SIGNAL INFORMATION IN WIRELESS CELLULAR COMMUNICATION SYSTEM

(71) Applicant: Samsung Electronics Co., Ltd., Gyeonggi-do (KR)

(72) Inventors: Cheolkyu Shin, Gyeonggi-do (KR); Youngwoo Kwak, Gyeonggi-do (KR); Taehyoung Kim, Gyeonggi-do (KR); Hoondong Noh, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 135 days.

This patent is subject to a terminal disclaimer.

(21) Appl. No.: 18/335,555

(22) Filed: Jun. 15, 2023

(65) Prior Publication Data

US 2023/0344596 A1 Oct. 26, 2023

Related U.S. Application Data

(63) Continuation of application No. 17/147,170, filed on Jan. 12, 2021, now Pat. No. 11,683,141, which is a (Continued)

(30) Foreign Application Priority Data

Dec. 22, 2017 (KR) .......................... 10-2017-0178380
Jan. 24, 2018 (KR) .......................... 10-2018-0008885

(51) Int. Cl.
*H04W 72/232* (2023.01)
*H04L 5/00* (2006.01)
(Continued)

(52) U.S. Cl.
CPC ............. *H04L 5/0051* (2013.01); *H04L 5/005* (2013.01); *H04L 5/0094* (2013.01); *H04L 27/26* (2013.01);
(Continued)

(58) Field of Classification Search
CPC ............... H04L 5/0051; H04L 27/261; H04W 72/0446; H04W 72/232; H04W 72/044; H04W 72/231
(Continued)

(56) References Cited

U.S. PATENT DOCUMENTS 9,554,339 B2    1/2017  Lee et al.
10,623,157 B2 *  4/2020  Kim ...................... H04W 72/04
(Continued)

FOREIGN PATENT DOCUMENTS

CN    104081707    10/2014
CN    106656448    5/2017
(Continued)

OTHER PUBLICATIONS

KR Decision of Rejection dated Jan. 24, 2024 Issued in counterpart application No. 10-2018-0008885, 8 pages.
(Continued)

*Primary Examiner* — John Pezzlo
(74) *Attorney, Agent, or Firm* — The Farrell Law Firm, P.C.

(57) ABSTRACT

The present disclosure relates to a communication method and system for converging a 5th generation (5G) communication system with a technology for Internet of Things (IoT) to support higher data rates beyond a 4th generation (4G) system. A method of a UE is provided. The method includes receiving, from a base station, configuration information including first information on a number of an additional demodulation reference signal (DMRS) symbol by
(Continued)

higher layer signaling, receiving, from the base station, downlink control information (DCI) including second information on a time domain resource, identifying third information on a duration in symbols of a scheduled physical downlink shared channel (PDSCH) resource based on the second information, identifying a position of a DMRS symbol based on the first information and the third information, and receiving, from the base station, at least one DMRS based on the position of the DMRS symbol.

20 Claims, 13 Drawing Sheets

Related U.S. Application Data continuation of application No. 16/227,604, filed on Dec. 20, 2018, now Pat. No. 10,897,755.

(51) Int. Cl.
  *H04L 27/26* (2006.01)
  *H04W 72/044* (2023.01)
  *H04W 72/23* (2023.01)
  *H04W 72/0446* (2023.01)

(52) U.S. Cl.
  CPC ......... *H04L 27/261* (2013.01); *H04W 72/044* (2013.01); *H04W 72/23* (2023.01); *H04L 5/0007* (2013.01); *H04L 5/0048* (2013.01)

(58) Field of Classification Search
  USPC .............................. 370/252, 329, 442, 430
  See application file for complete search history.

(56) References Cited

U.S. PATENT DOCUMENTS

| | | | | |
|---|---|---|---|---|
| 11,212,053 | B2* | 12/2021 | Manolakos | H04L 5/0012 |
| 11,418,379 | B2* | 8/2022 | Kim | H04L 27/2675 |
| 2011/0149879 | A1* | 6/2011 | Noriega | H04W 72/543 370/329 |
| 2013/0322350 | A1* | 12/2013 | Gaur | H04W 72/542 370/329 |
| 2014/0321421 | A1 | 10/2014 | Popovic et al. | |
| 2017/0171842 | A1 | 6/2017 | You et al. | |
| 2017/0208569 | A1 | 7/2017 | Park et al. | |
| 2017/0289899 | A1 | 10/2017 | You et al. | |
| 2018/0376495 | A1 | 12/2018 | Lea | |
| 2019/0052420 | A1 | 2/2019 | Manolakos | |
| 2019/0082431 | A1 | 3/2019 | Yi | |
| 2019/0098580 | A1 | 3/2019 | Babaci | |
| 2020/0008228 | A1 | 1/2020 | Lee | |
| 2020/0028643 | A1 | 1/2020 | Kim | |
| 2020/0077432 | A1 | 3/2020 | Xiong | |
| 2020/0221435 | A1* | 7/2020 | Kim | H04L 5/0048 |
| 2020/0296747 | A1 | 9/2020 | Kim | |

FOREIGN PATENT DOCUMENTS

| | | |
|---|---|---|
| KR | 1020180010964 | 1/2018 |
| WO | WO 2018/064313 | 4/2018 |

OTHER PUBLICATIONS

Australian Examination Report dated Jun. 19, 2023 Issued in counterpart application No. 2018390056, 4 pages.
KR Decision of Rejection dated Sep. 17, 2023 ssued in counterpart application No. 10-2018-0008885, 11 pages.
3GPP, 3rd Generation Partnership Project; Technical Specification Group Radio Access Network; NR; Physical Channels and Modulation (Release 15), 3GPP TS 38.211 V2.0.0, Dec. 14, 2017, 73 pages.
LG Electronics, "On DMRS Design", R1-1719912, 3GPP TSG RAN WG1 Meeting #91, Nov. 27-Dec. 1, 2017, 7 pages.
Vivo, "Remaining Details on DMRS Design", R1-1719774, 3GPP TSG RAN WG1 Meeting #91, Nov. 27-Dec. 1, 2017, 9 pages.
International Search Report dated Apr. 3, 2019 issued in counterpart application No. PCT/KR2018/016586, 4 pages.
Qualcomm, "Further Offline Discussion on NR DM-RS", R1-1721410, 3GPP TSG RAN WG1 Meeting 91, Nov. 27-Dec. 1, 2017, 22 pages.
European Search Report dated Jul. 23, 2020 issued in counterpart application No. 18891210.9-1205, 7 pages.
CATT, Discussion on Remaining Details of DMRS Design, R1-1720186, 3GPP TSG RAN WG1 Meeting 91, Nov. 27-Dec. 1, 2017, 12 pages.
European Search Report dated Feb. 2, 2022 issued in counterpart application No. 18891210.9-1205, 8 pages.
Indian Examination Report dated Apr. 29, 2022 issued in counterpart application No. 202037023922, 6 pages.
3GPP TS 38.211 V1.3.0, 3GPP, 3rd Generation Partnership Project; Technical Specification Group Radio Access Network; NR; Physical Channels and Modulation (Release 15), Dec. 2017, 73 pages.
Korean Office Action dated Mar. 10, 2023 issued in counterpart application No. 10-2018-0008885, 8 pages.
ZTE, "Discussion on Downlink DMRS Design", R1-1712305, 3GPP TSG RAN WG1 Meeting #90, Aug. 21-25, 2017, 10 pages.
Chinese Office Action dated Nov. 3, 2022 issued in counterpart application No. 201880083246.6, 13 pages.
Indian Hearing Notice dated Jul. 10, 2024 issued in counterpart application No. 202037023922, 3 pages.
3GPP TS 38.221 V1.2.0 (Nov. 2017), 59 pages.
European search report dated Jul. 3, 2025 issued in counterpart application No. 18891210.9-1206, 11 pages.

* cited by examiner

FIG. 2

One symbol pattern b10
| 2/3 | CDM group 1 |
| 0/1 | CDM group 0 |
| 2/3 | CDM group 1 |
| 0/1 | CDM group 0 |
| 2/3 | CDM group 1 |
| 0/1 | CDM group 0 |
| 2/3 | CDM group 1 |
| 0/1 | CDM group 0 |
| 2/3 | CDM group 1 |
| 0/1 | CDM group 0 |
| 2/3 | CDM group 1 |
| 0/1 | CDM group 0 |

Two symbol pattern b20
| 2/3/6/7 | CDM group 1 |
| 0/1/4/5 | CDM group 0 |
| 2/3/6/7 | CDM group 1 |
| 0/1/4/5 | CDM group 0 |
| 2/3/6/7 | CDM group 1 |
| 0/1/4/5 | CDM group 0 |
| 2/3/6/7 | CDM group 1 |
| 0/1/4/5 | CDM group 0 |
| 2/3/6/7 | CDM group 1 |
| 0/1/4/5 | CDM group 0 |
| 2/3/6/7 | CDM group 1 |
| 0/1/4/5 | CDM group 0 |

▨ : 200
▤ : 210
▩ : 220

One symbol pattern b30
| 4/5 | CDM group 2 |
| 4/5 | |
| 2/3 | CDM group 1 |
| 2/3 | |
| 0/1 | CDM group 0 |
| 0/1 | |
| 4/5 | CDM group 2 |
| 4/5 | |
| 2/3 | CDM group 1 |
| 2/3 | |
| 0/1 | CDM group 0 |
| 0/1 | |

Two symbol pattern b40
| 4/5/10/11 | CDM group 2 |
| 4/5/10/11 | |
| 2/3/8/9 | CDM group 1 |
| 2/3/8/9 | |
| 0/1/6/7 | CDM group 0 |
| 0/1/6/7 | |
| 4/5/10/11 | CDM group 2 |
| 4/5/10/11 | |
| 2/3/8/9 | CDM group 1 |
| 2/3/8/9 | |
| 0/1/6/7 | CDM group 0 |
| 0/1/6/7 | |

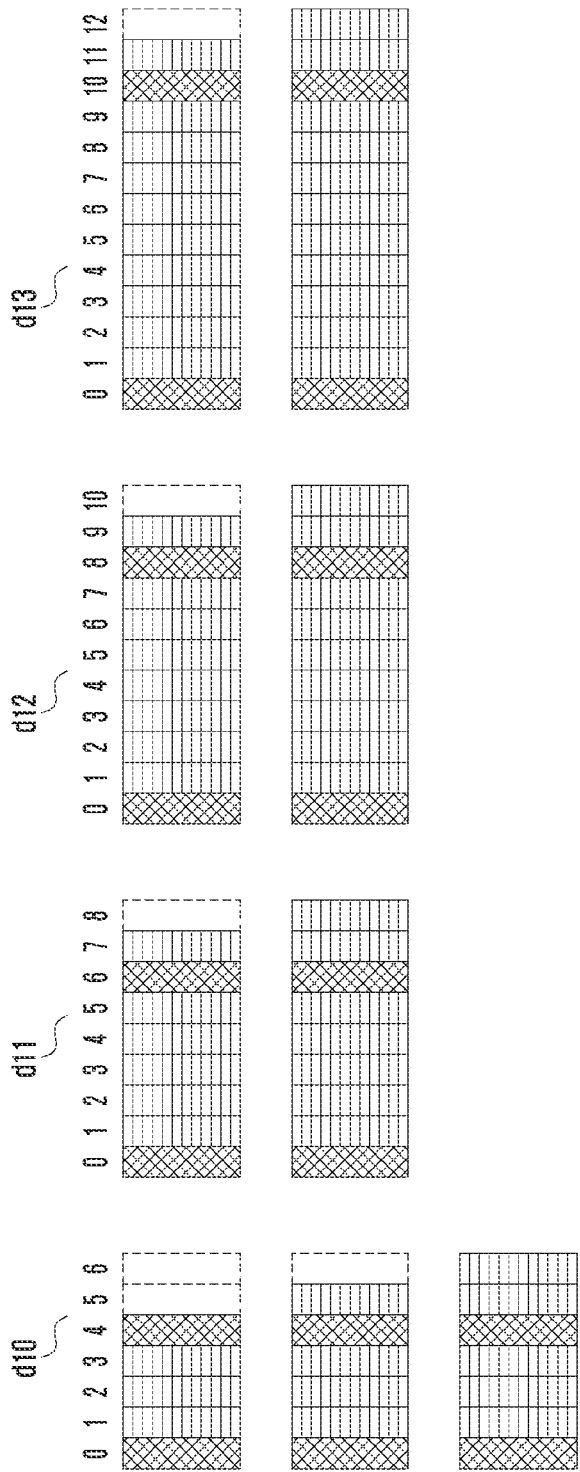

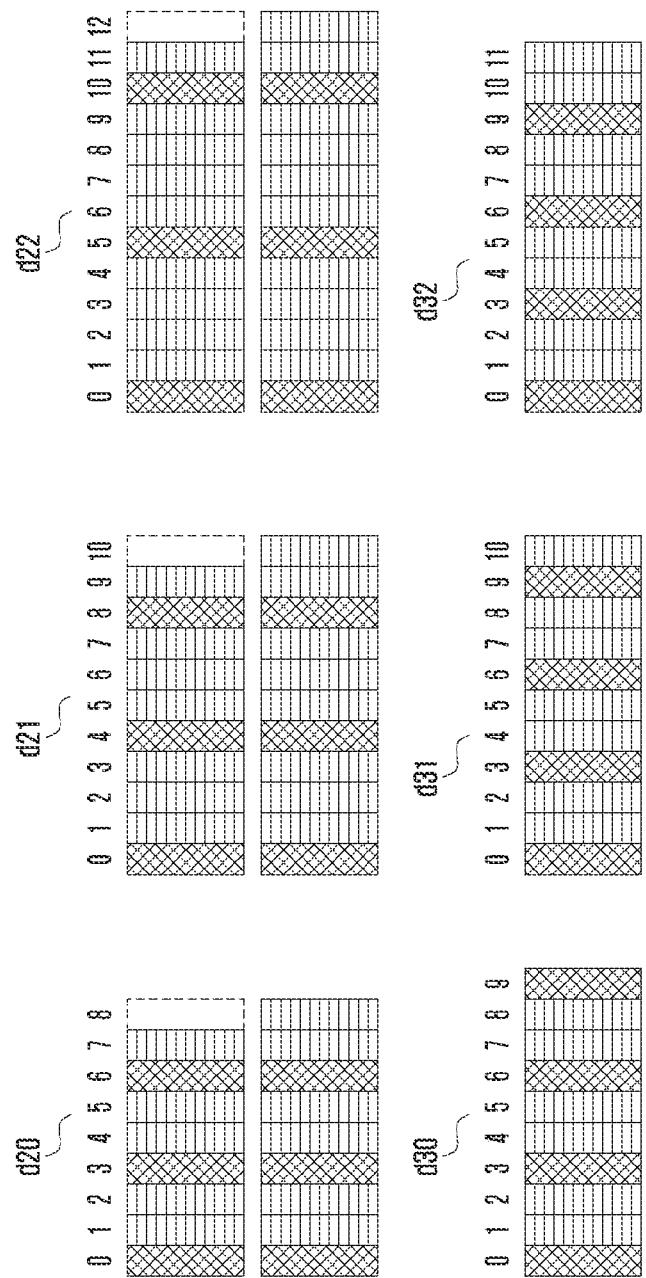

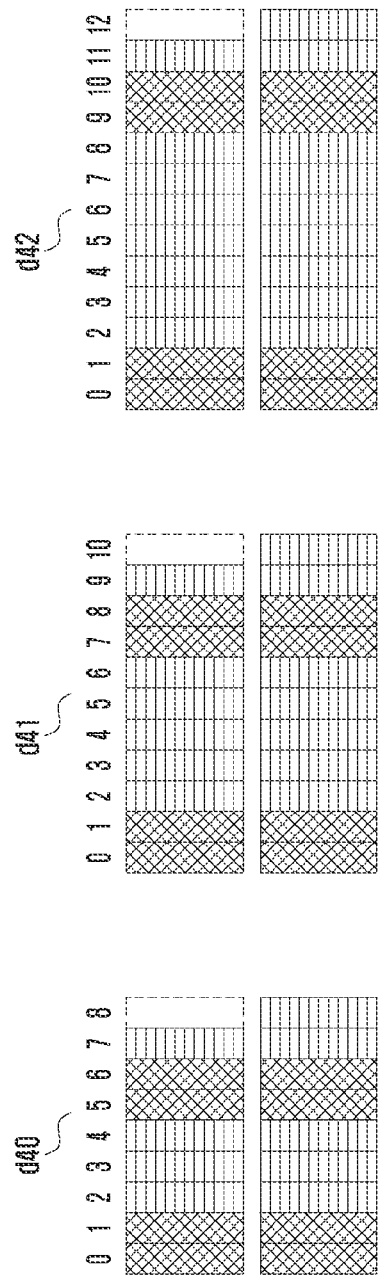

METHOD AND APPARATUS FOR CONFIGURING DEMODULATION REFERENCE SIGNAL INFORMATION IN WIRELESS CELLULAR COMMUNICATION SYSTEM

CROSS-REFERENCE TO RELATED APPLICATION(S)

This application is a Continuation of U.S. application Ser. No. 17/147,170, which was filed in the U.S. Patent and Trademark Office (USPTO) on Jan. 12, 2021, which is a Continuation of U.S. application Ser. No. 16/227,604, which was filed in the USPTO on Dec. 20, 2018, issued as U.S. Pat. No. 10,897,775 on Jan. 19, 2021, and claims priority under 35 U.S.C. § 119 to Korean Patent Application Serial Nos. 10-2017-0178380 and 10-2018-0008885, which were filed in the Korean Intellectual Property Office on Dec. 22, 2017, and Jan. 24, 2018, respectively, the entire disclosures of which are incorporated herein by reference.

BACKGROUND

1. Field

The present disclosure relates generally to a wireless communication system and a method and apparatus for configuring demodulation reference signal (DMRS) related information.

2. Description of Related Art

Since the commercial deployment of 4G communication systems, efforts have been made to develop improved 5G or pre-5G communication systems to meet the ever increasing demand for wireless data traffic. As such, 5G or pre-5G communication systems are also called "beyond 4G network" or "post LTE system". To achieve higher data rates, 5G communication systems consider utilization of the mmWave band (e.g., 60 GHz band). To decrease path loss and increase the transmission distance in the mmWave band, various technologies including beamforming, massive multiple-input multiple-output (MIMO), full dimensional MIMO (FD-MIMO), array antennas, analog beamforming, and large scale antennas are considered for 5G communication systems. To improve system networks in 5G communication systems, technology development is under way regarding evolved small cells, advanced small cells, cloud radio access networks (RANs), ultra-dense networks, device-to-device (D2D) communication, wireless backhaul, moving networks, cooperative communication, coordinated multi-points (CoMP), reception interference cancellation, and the like. In addition, advanced coding and modulation (ACM) schemes such as hybrid frequency-shift keying (FSK) and quadrature amplitude modulation (QAM) (FQAM) and sliding window superposition coding (SWSC). Advanced access technologies such as filter bank multi carrier (FBMC), non-orthogonal multiple access (NOMA), and sparse code multiple access (SCMA) are also under development for 5G communication systems.

Meanwhile, the Internet is evolving into the Internet of things (IoT) where distributed elements or things process and exchange information. There has also emerged the Internet of everything (IoE) technology that combines IoT technology with big data processing technology through connection with cloud servers. To realize IoT services, base technologies related to sensing, wired/wireless communication and network infrastructure, service interfacing, and security are needed, and technologies interconnecting things such as sensor networks, machine-to-machine (M2M) or machine type communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and M2M or MTC are being realized by use of 5G communication technologies including beamforming, MIMO, and array antennas. Application of cloud RANs to big data processing described above may be an instance of convergence of 5G communication technology and IoT technology.

In the new radio (NR) system, which is a new 5G communication system, the DMRS configuration is very flexible compared with the existing system. Specifically, two different DMRS patterns are supported, the front-loaded DMRS position can be set differently depending on the situation, and the number of additional DMRSs can be set in various manners. Hence, it is important to configure the DMRS related information so that the system works well.

SUMMARY

The present disclosure has been made to address at least the disadvantages described above and to provide at least the advantages described below. Accordingly, an aspect of the present invention is to provide a method for effectively configuring DMRS-related information.

In accordance with an aspect of the present disclosure, a method of a user equipment (UE) is provided. The method includes receiving, from a base station, configuration information including first information on a number of an additional demodulation reference signal (DMRS) symbols by higher layer signaling, receiving, from the base station, downlink control information (DCI) including second information on a time domain resource, identifying third information on a duration in symbols of a scheduled physical downlink shared channel (PDSCH) resource based on the second information, identifying a position of a DMRS symbol based on the first information and the third information, and receiving, from the base station, at least one DMRS based on the position of the DMRS symbol.

In accordance with an aspect of the present disclosure, a method of a base station is provided. The method includes transmitting, to a UE, configuration information including first information on a number of an additional DMRS symbols by higher layer signaling, transmitting, to the UE, DCI including second information on a time domain resource, and transmitting, to the UE, at least one DMRS based on a position of a DMRS symbol. The position of the DMRS symbol is identified based on the first information and third information on a duration in symbols of a scheduled PDSCH resource, the third information being identified based on the second information.

In accordance with an aspect of the present disclosure, a UE in a wireless communication system is provided. The UE includes a transceiver and a processor operably connected to the transceiver. The processor is configured to control the transceiver to receive, from a base station, configuration information including first information on a number of an additional DMRS symbols by higher layer signaling, control the transceiver to receive, from the base station, DCI including second information on a time domain resource, identify third information on a duration in symbols of a scheduled PDSCH resource based on the second information, identify a position of a DMRS symbol based on the first information and the third information, and control the transceiver to receive, from the base station, at least one DMRS based on the position of the DMRS symbol.

In accordance with an aspect of the present disclosure, a base station in a wireless communication system is provided. The base station includes a transceiver and a processor operably connected to the transceiver. The processor is configured to control the transceiver to transmit, to a UE, configuration information including first information on a number of an additional DMRS symbols by higher layer signaling, transmit, to the UE, DCI including second information on a time domain resource, and transmit, to the UE, at least one DMRS based on a position of a DMRS symbol. The position of the DMRS symbol is identified based on the first information and third information on a duration in symbols of a scheduled PDSCH resource, the third information being identified based on the second information.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 2 is a diagram of two DMRS patterns, according to an embodiment;

FIGS. 4A, 4B, and 4C are diagrams of locations of DMRSs and an additional DMRS, according to an embodiment;

DETAILED DESCRIPTION

Figure 1:
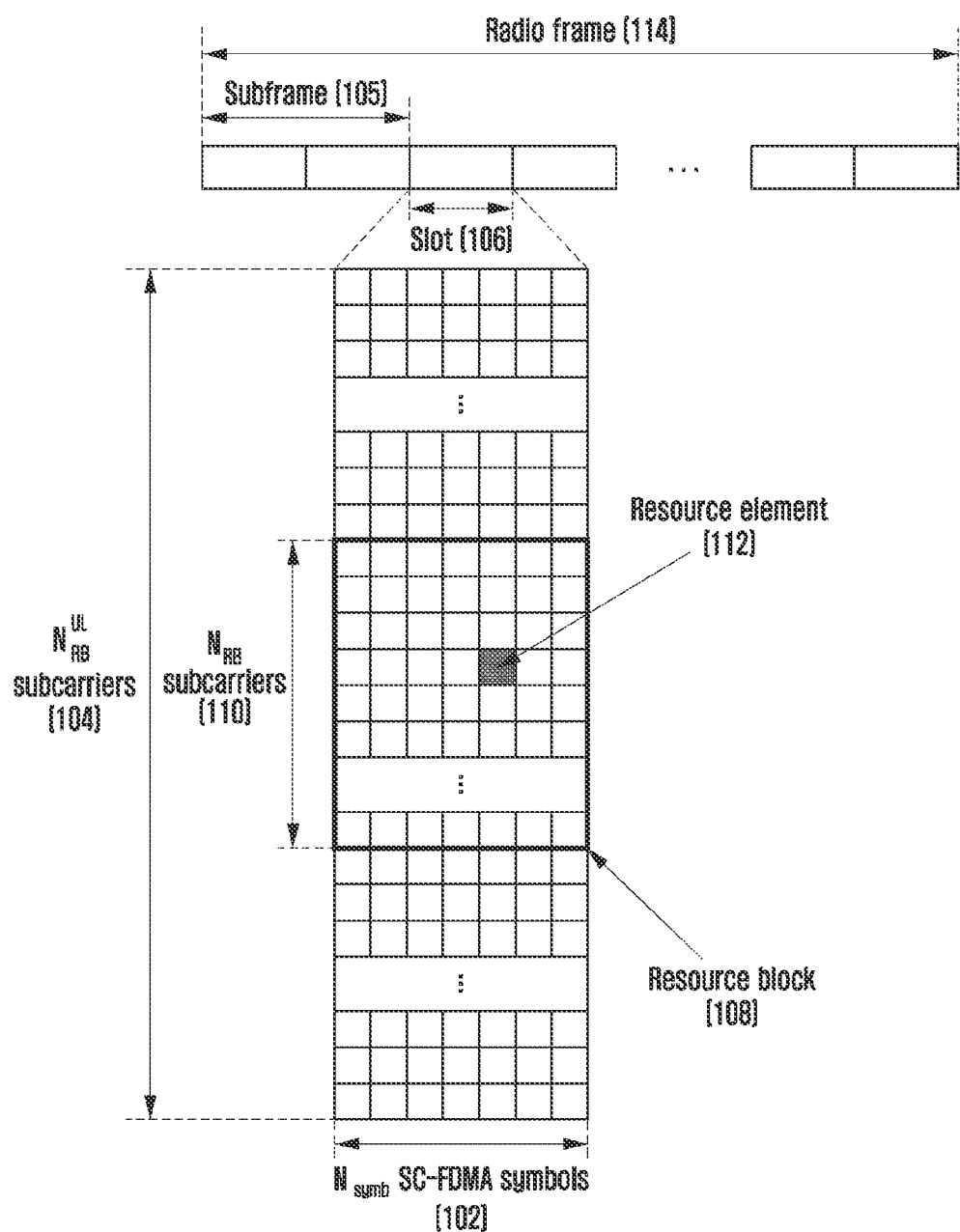
FIG. 1 is a diagram of a basic configuration of a time-frequency domain in an NR system, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an IoT device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

In the following description, the NR, LTE (long term evolution), and LTE-A (LTE-advanced) systems are taken as an example of the present disclosure (LTE systems may include LTE and LTE-A systems). However, the present disclosure is applicable to other communication systems using licensed and unlicensed bands without significant modification.

In contrast to early wireless communication systems that provided voice-oriented services only, advanced broadband wireless communication systems, such as 3GPP high speed packet access (HSPA) systems, LTE or evolved universal terrestrial radio access (E-UTRA) systems, LTE-A systems, 3GPP2 high rate packet data (HRPD) systems, ultra mobile broadband (UMB) systems, and IEEE 802.16e based systems, may provide high-speed and high-quality packet data services. In addition, communication standards are being developed for 5G or NR systems as the fifth generation wireless communication system.

As a representative example of the broadband wireless communication system, the NR system employs orthogonal frequency division multiplexing (OFDM) in the downlink (DL), and employs both discrete Fourier transform spread OFDM (DFT-S-OFDM) and OFDM in the uplink (UL). UL refers to a radio link through which a terminal (a UE or mobile station (MS)) sends a data or control signal to a BS (or eNode B), and the downlink refers to a radio link through which a base station sends a data or control signal to a terminal. In such multiple access schemes, time-frequency resources used to carry user data or control information are allocated so as not to overlap each other (i.e. maintain orthogonality) to thereby identify the data or control information of a specific user.

FIG. 1 is a diagram of a basic configuration of a time-frequency domain, which is a radio resource region in which data or control channels are transmitted, in an NR system, according to an embodiment.

In FIG. 1, the horizontal axis denotes the time domain and the vertical axis denotes the frequency domain. In the time domain, the minimum unit for downlink transmission is OFDM symbols, the minimum unit for uplink transmission is OFDM or DFT-S-OFDM symbols, and 14 symbols form one slot ($N_{symb}^{slot}$) in the case of normal cyclic prefix (NCP). A plurality of symbols constitute one subframe 105 according to the numerology of NR. The length of a subframe is 1 ms. The number of OFDM or DFT-S-OFDM symbols constituting the subframe is shown in Table 1 below.

TABLE 1

Number of OFDM symbols per slot, $N_{symb}^{slot}$ for NCP

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the frequency domain, the minimum unit for transmission is a subcarrier, and the total system transmission bandwidth is composed of a total $N_{RB,x}^{max,\mu} \cdot N_{sc}^{RB}$ subcarriers. The value of $N_{RB,x}^{max,\mu}$ is given in Table 2 for the uplink and the downlink. $N_{sc}^{RB}$ is the number of subcarriers of the resource block, and the resource block 108 is defined by 12 consecutive subcarriers in the frequency domain. The basic unit of resources in the time-frequency domain is a resource element (RE) 112, and the RE may be represented by an OFDM or DFT-S-OFDM symbol index and a subcarrier index.

TABLE 2

| $\mu$ | $N_{RB,DL}^{min,\mu}$ | $N_{RB,DL}^{max,\mu}$ | $N_{RB,UL}^{min,\mu}$ | $N_{RB,UL}^{max,\mu}$ |
|---|---|---|---|---|
| 0 | 24 | 275 | 24 | 275 |
| 1 | 24 | 275 | 24 | 275 |
| 2 | 24 | 275 | 24 | 275 |
| 3 | 24 | 275 | 24 | 275 |
| 4 | 24 | 138 | 24 | 138 |
| 5 | 24 | 69  | 24 | 69  |

In the NR system, two DMRS patterns are supported.

FIG. 2 is a diagram of two DMRS patterns, according to an embodiment. In FIG. 2, b10 and b20 indicate DMRS configuration type 1, and b10 indicates a one-symbol pattern corresponding to one symbol and b20 indicates a two-symbol pattern corresponding to two symbols.

The one-symbol pattern (b10, b30) may be referred to as a single-symbol DMRS, and the two-symbol pattern (b20, b40) may be referred to as a double-symbol DMRS.

DMRS configuration type 1 indicated by b10 and b20 is a DMRS pattern of comb 2 structure and can be composed of two code division multiplexing (CDM) groups, and different CDM groups are frequency division multiplexed (FDM). Specifically, in b10 and b20, the portions denoted by 210 indicate CDM group 0 and the portions denoted by 200 indicate CDM group 1. In the one-symbol pattern of b10, frequency-based CDM is applied to the same CDM group so that two DMRS ports can be identified, and hence a total of four orthogonal DMRS ports can be set. In b10, the DMRS port identifier (ID) mapped to the CDM group is shown (the actual ID may be equal to the number shown plus 1000). In the two-symbol pattern of b20, time and frequency based CDM is applied to the same CDM group so that four DMRS ports can be identified, and hence a total of eight orthogonal DMRS ports can be set. In b20, the DMRS port identifier (ID) mapped to the CDM group is shown (the actual ID may be equal to the number shown plus 1000).

In FIG. 2, DMRS configuration type 1 indicated by b30 and b40 is a DMRS pattern of a structure where a frequency domain orthogonal cover code (FD-OCC) is applied to adjacent subcarriers and can be composed of three CDM groups, and different CDM groups are FDMed. Specifically, in b30 and b40, the portions denoted by 220 indicate CDM group 0, the 210 portions indicate CDM group 1, and the 200 portions indicate CDM group 0. In the one-symbol pattern of b30, frequency-based CDM is applied to the same CDM group so that two DMRS ports can be identified, and hence a total of six orthogonal DMRS ports can be set. In b30, the DMRS port ID mapped to the CDM group is shown (the actual ID may be equal to the number shown plus 1000). In the two-symbol pattern of b40, time and frequency based CDM is applied to the same CDM group so that four DMRS ports can be identified, and hence a total of 12 orthogonal DMRS ports can be set. In b40, the DMRS port ID mapped to the CDM group is shown (the actual ID may be equal to the number shown plus 1000).

As described above, two different types of DMRS patterns can be set in the NR system. For example, in FIG. 2, there may be DMRS configuration type 1 indicated by b10 and b20 and DMRS configuration type 2 indicated by b30 and b40.

Also, the DMRS pattern can be a single-symbol DMRS corresponding to one symbol or a double-symbol DMRS corresponding to two neighboring symbols. For example, in FIG. 2, there may be single-symbol DMRSs indicated by b10 and b30 and double-symbol DMRSs indicated by b20 and b40.

It is possible to schedule the scheduled DMRS port numbers and to signal the number of the scheduled CDM groups for rate matching of the physical downlink shared channel (PDSCH). With CP (cyclic prefix)-OFDM, the two types of DMRS patterns are supported in the downlink and the uplink. With DFT-S-OFDM, only DMRS configuration type 1 of the DMRS pattern types is supported in the uplink.

The NR system supports front-loaded and additional DMRSs. The front-loaded DMRS refers to the first DMRS in time among the front-most symbols, and the additional DMRS refers to the DMRS appearing in the symbols after the front-loaded DMRS. The number of additional DMRS in the NR system can be from zero to three.

Furthermore, when an additional DMRS is configured, the same type as the front-loaded DMRS is assumed. For example, the additional DMRS is configured to have the same DMRS configuration type (type 1 or type 2) as the front-loaded DMRS. If the front-loaded DMRS is a one-symbol pattern (b10 and b30), the additional DMRS is also configured as one-symbol pattern, and if the front-loaded DMRS is a two-symbol pattern (b20 and b40), the additional DMRS is also configured as a two-symbol pattern.

FIGS. 4A to 4C are diagrams of locations of DMRSs and an additional DMRS, according to an embodiment.

The portions denoted by 300 and the portions denoted by 400 in the DMRS position related drawings indicate symbols via which the DMRS is transmitted, and a configured DMRS pattern (b10, b20, b30 or b40) of the two types of DMRS patterns described with reference to FIG. 2 can be transmitted at the location indicated by the portions 220.

For slot-based scheduling as shown in FIGS. 3A to 3D, the symbol number can be indexed relative to the first OFDM symbol of the slot. For non-slot-based scheduling as shown in FIGS. 4A to 4C, the symbol number can be indexed relative to the first scheduled OFDM symbol.

In the NR system, the position of the DMRS can be set separately for PDSCH mapping type A and PDSCH mapping type B, and it can also be set separately for PUSCH mapping type A and PUSCH mapping type B. More detailed information is described in the following embodiments. Further, additional settings for the DMRS information are described in more detail in the following embodiments.

Hereinafter, embodiments of the present invention are described in detail with reference to the accompanying drawings. The following description is focused on the NR system. However, it should be understood by those skilled in the art that the subject matter of the present invention is applicable to other communication systems having similar technical backgrounds and channel configurations without significant modifications departing from the scope of the present invention.

Descriptions of well-known functions and structures incorporated herein may be omitted to avoid obscuring the subject matter of the present invention. Particular terms may be defined to describe the invention in the best manner. Hence, the meaning of specific terms or words used in the specification and the claims should be construed in accordance with the spirit of the present invention. In the following description, the base station (BS) may be at least one of eNode B, Node B, a radio access unit, a base station controller, and a node on a network. The terminal may be a user equipment (UE), a mobile station (MS), a cellular phone, a smartphone, a computer, or a multimedia system capable of performing communication functions. The uplink (UL) refers to a wireless transmission path through which the terminal transmits a signal to the base station. In the above description, the one-symbol pattern (b10 and b30 of FIG. 2) among the DMRS patterns may be referred to as a single-symbol DMRS and the two-symbol pattern (b20 and b40 of FIG. 2) may be referred to as a double-symbol DMRS.

In the following description, the first embodiment of the present invention relates to a method for determining the DMRS position configuration according to the length of DL or UL symbols that can be assigned to the slot. The second embodiment relates to a method for determining the DMRS position configuration according to the length of actually scheduled DL or UL symbols. The third embodiment proposes a method of configuring DMRS information via RRC. Although the number of bits required to indicate the DMRS ports may vary according to the DMRS configuration, the fourth embodiment proposes a method of composing a DMRS port indication table to keep the DCI overhead the same. The fifth embodiment proposes a method of determining the length of a DMRS sequence to be generated.

First Embodiment

The first embodiment proposes a method for determining the DMRS position configuration described above according to the length of DL or UL symbols that can be assigned to the slot. In the first embodiment, the DMRS position for the PDSCH in the downlink can be set as follows.
DMRS position setting for PDSCH
PDSCH mapping type A
  The position of the front-loaded DMRS is fixed at the third or fourth symbol
  The position of the additional DMRS is described in FIGS. 3A to 3D
PDSCH mapping type B
  The position of the front-loaded DMRS is the first scheduled symbol
  No additional DMRS for 2/4 symbol non-slot based scheduling
  For non-slot based scheduling of different symbol lengths including 7 symbol non-slot based scheduling, refer to FIGS. 4A to 4C for the position of the additional DMRS The DMRS position setting for the PDSCH can be divided according to PDSCH mapping types A and B. Specifically, PDSCH mapping type A can be interpreted as a DMRS position setting scheme based on slot-based scheduling, and PDSCH mapping type B can be interpreted as a DMRS position setting scheme based on non-slot based scheduling.

The position of the front-loaded DMRS is set differently according to PDSCH mapping type A or B. More specifically, in the case of PDSCH mapping type A, the position of the front-loaded DMRS is fixed at the third or fourth symbol. With PDSCH mapping type B, the position of the front-loaded DMRS is located at the first symbol of the scheduled PDSCH.

In FIGS. 3A to 3D, for PDSCH mapping type A, the position of the front-loaded DMRS and the position of the additional DMRS are shown together. The portions denoted by 300 indicate the position of a symbol through which the DMRS is transmitted and some of the subcarriers may be used for PDSCH transmission depending on the number of CDM groups used. The portions denoted by 310a indicate a possible region where the PDSCH can be transmitted according to the method proposed in the first embodiment. For example, the actual PDSCH scheduling may be smaller than the region where the PDSCH can be transmitted. The portions denoted by 320 indicate a region where the PDSCH is not transmitted. For example, the 320 portion can be used for the PUSCH region. The portions denoted by 330 indicate a region where the physical downlink control channel (PDCCH) can be transmitted in the case of DL, and this portion can also be used for PDSCH transmission if the PDCCH is not transmitted (and vice versa for PUSCH).

FIGS. 3A to 3D show the position where the DMRS is transmitted based on the possible region in which the PDSCH can be transmitted according to the method proposed in the first embodiment of the present invention.

Figure 3A:
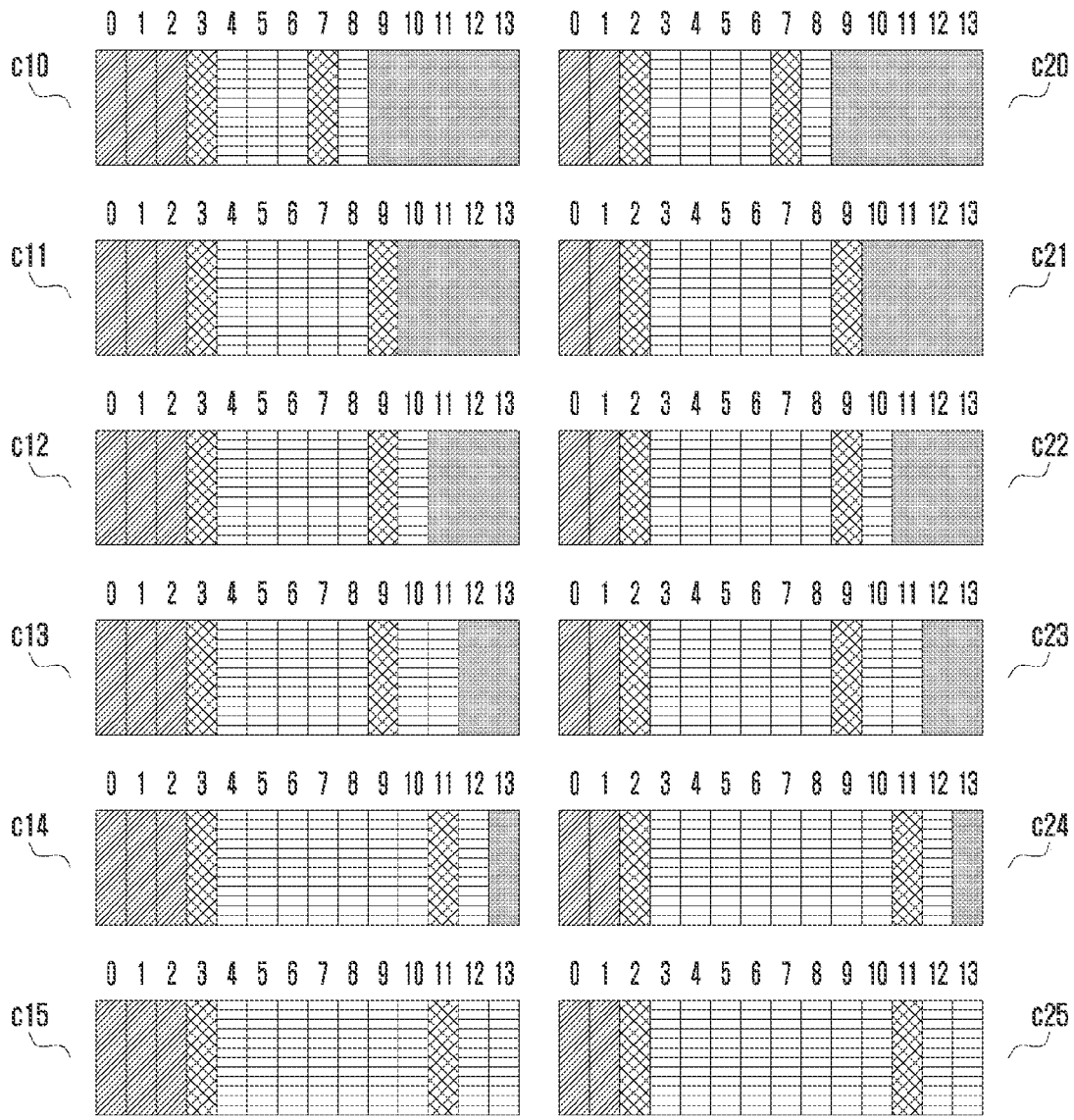
FIGS. 3A, 3B, 3C and 3D are diagrams of locations where DMRSs are transmitted, according to an embodiment.
Figure 3B:
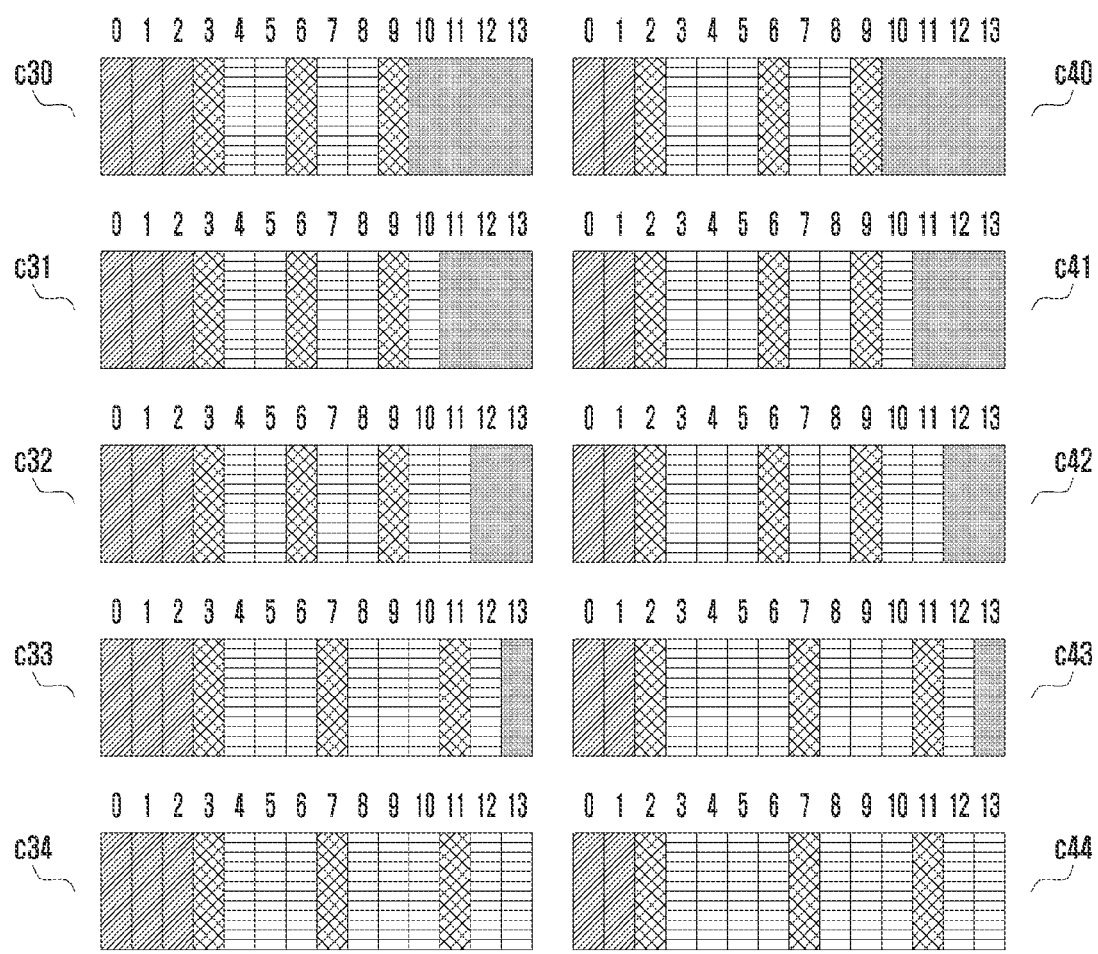
Figure 3C:
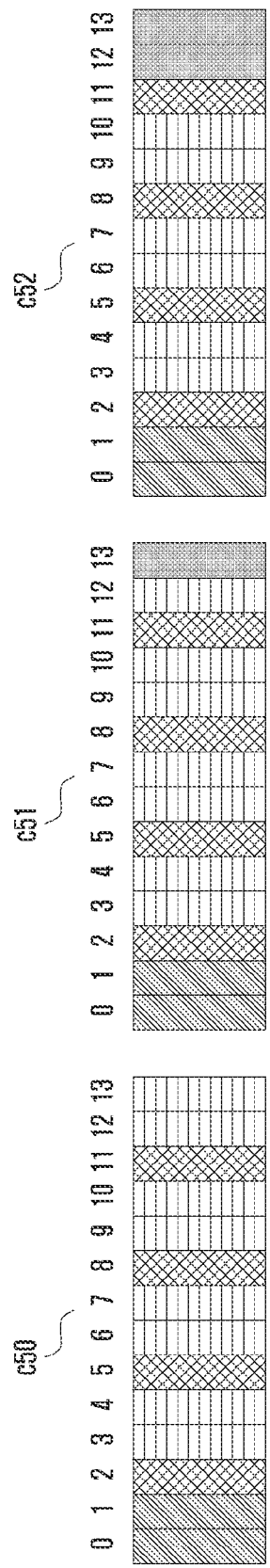
Figure 3D:
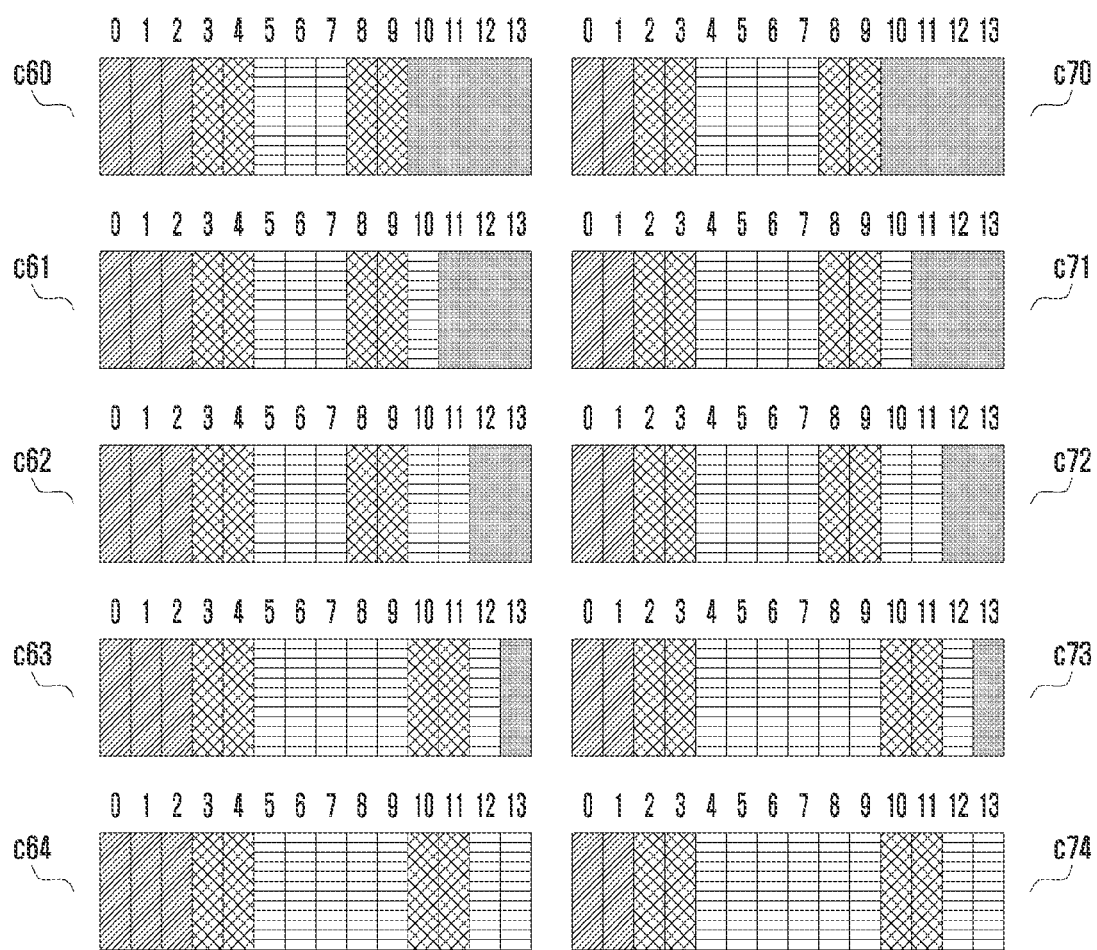

FIGS. 3A to 3D illustrate locations where the DMRS is transmitted according to various embodiments of the present invention. In FIGS. 3A and 3B, c10 to c52 indicate possible DMRS positions when the one-symbol front loaded DMRS is configured to transmit the DMRS via one symbol. In FIG. 3D, c60 to c74 indicate possible DMRS positions when the two-symbol front loaded DMRS is configured to transmit the DMRS via two adjacent symbols.

In FIG. 3A, c10 to c25 indicate possible DMRS positions when the one-symbol front loaded DMRS and one additional DMRS are configured, c10 to c15 indicate possible positions of the additional DMRS when the front loaded DMRS is set at the fourth symbol, and c20 to c25 indicate possible positions of the additional DMRS when the front loaded DMRS is set at the third symbol. More specifically, in c10 and c20, the portion of the slot except for the last five symbols indicated in 320 is the possible region where the PDSCH can be transmitted, and the additional DMRS is transmitted via the eighth symbol. In c11 and c21, the portion of the slot except for the last four symbols indicated in 320 is the possible region where the PDSCH can be transmitted, and the additional DMRS is transmitted via the tenth symbol. In c12 and c22, the portion of the slot except for the last three symbols indicated in 320 is the possible region where the PDSCH can be transmitted, and the additional DMRS is transmitted via the tenth symbol. In c13 and c23, the portion of the slot except for the last two symbols indicated in 320 is the possible region where the PDSCH can be transmitted, and the additional DMRS is transmitted via the 10th symbol. In c14 and c24, the portion of the slot except for the last symbol indicated in 320 is the possible region where the PDSCH can be transmitted, and the additional DMRS is transmitted via the 12th symbol. In c15 and c25, the whole portion of the slot is the possible region where the PDSCH can be transmitted, and the additional DMRS is transmitted via the 12th symbol.

In FIG. 3B, c30 to c44 indicate possible DMRS positions when the one-symbol front loaded DMRS and two additional DMRSs are configured, c30 to c34 indicate possible positions of the additional DMRS when the front loaded DMRS is set at the 4th symbol, and c40 to c44 indicate possible positions of the additional DMRS when the front loaded DMRS is set at the 3rd symbol. More specifically, in c30 and c40, the portion of the slot except for the last four symbols indicated in 320 is the possible region where the PDSCH can be transmitted, and the additional DMRS is transmitted via the 7th and 10th symbols. In c31 and c41, the portion of the slot except for the last three symbols indicated in 320 is the possible region where the PDSCH can be transmitted, and the additional DMRS is transmitted via the 7th and 10th symbols. In c32 and c42, the portion of the slot except for the last two symbols indicated in 320 is the possible region where the PDSCH can be transmitted, and the additional DMRS is transmitted via the 7th and 10th symbols. In c33 and c43, the portion of the slot except for the last symbol indicated in 320 is the possible region where the PDSCH can be transmitted, and the additional DMRS is transmitted via the 8th and 12th symbols. In c34 and c44, the whole portion of the slot is the possible region where the PDSCH can be transmitted, and the additional DMRS is transmitted via the 8th and 12th symbols.

In FIG. 3C, c50 to c52 indicate possible DMRS positions when the one-symbol front loaded DMRS and three additional DMRSs are configured. This is possible when the front loaded DMRS is configured at the 3rd symbol in consideration of the actual usage scenario as shown in FIG. 3C. More specifically, when three additional DMRSs are configured as shown by c50 to c52, the additional DMRS is transmitted via the 6th, 9th, and 12th symbols regardless of the possible region where the PDSCH can be transmitted.

In FIG. 3D, c60 to c74 indicate possible DMRS positions when the two-symbol front loaded DMRS and one additional DMRS are configured. Considering the DMRS overhead and the actual usage scenario, at most one additional DMRS can be configured when the two-symbol front loaded DMRS is configured. In c60 to c64 indicate possible positions of the additional DMRS when the first front loaded DMRS symbol is configured at the 4th symbol. In c70 to c74 indicate possible positions of the additional DMRS when the first front loaded DMRS symbol is configured at the 3rd symbol. More specifically, in c60 and c70, the portion of the slot except for the last four symbols indicated in 320 is the possible region where the PDSCH can be transmitted, and the first symbol of the additional DMRS is transmitted via the 9th symbol. In c61 and c71, the portion of the slot except for the last three symbols indicated in 320 is the possible region where the PDSCH can be transmitted, and the first symbol of the additional DMRS is transmitted via the 9th symbol. In c62 and c72, the portion of the slot except for the last two symbols indicated in 320 is the possible region where the PDSCH can be transmitted, and the first symbol of the additional DMRS is transmitted via the 9th symbol. In c63 and c73, the portion of the slot except for the last symbol indicated in 320 is the possible region where the PDSCH can be transmitted, and the first symbol of the additional DMRS is transmitted via the 11th symbol. In c64 and c74, the whole portion of the slot is the possible region where the PDSCH can be transmitted, and the first symbol of the additional DMRS is transmitted via the 11th symbol.

On the other hand, for PDSCH mapping type B, the position of the front-loaded DMRS is set at the first scheduled symbol. In the case of 2 or 4 symbol non-slot based scheduling, no additional DMRS is configured owing to the short symbol length and DMRS overhead. For non-slot based scheduling of different lengths including 7-symbol non-slot based scheduling, a description is given of the position of the additional DMRS with reference to FIGS. 4A to 4C.

FIGS. 4A to 4C show the locations of DMRSs and an additional DMRS according to an embodiment. In FIGS. 4A to 4C, the portions denoted by 400 indicate DMRS location (e.g., the part of subcarriers in DMRS symbol that can be used for PDSCH transmission). The portions demoted by 410 indicate a possible location of the PDSCH. In FIGS. 4A and 4B, d10 to d32 indicate possible DMRS positions when the one-symbol front loaded DMRS is configured. In FIG. 4C, d40 to d42 indicate possible DMRS positions when the two-symbol front loaded DMRS is configured.

In FIG. 4A, d10 to d13 indicate the possible DMRS positions when the one-symbol front loaded DMRS and one additional DMRS are configured. In d10, when the possible region where the PDSCH can be transmitted is configured in the 5th to 7th symbols, the additional DMRS is transmitted via the 5th symbol. In d11, when the possible region where the PDSCH can be transmitted is configured in the 8th and 9th symbols, the additional DMRS is transmitted via the 7th symbol. In d12, when the possible region where the PDSCH can be transmitted is configured in the 10th and 11th symbols, the additional DMRS is transmitted via the 9th symbol. In d13, when the possible region where the PDSCH can be transmitted is configured in the 12th and 13th symbols, the additional DMRS is transmitted via the 11th symbol.

In FIG. 4B, d20 to d22 indicate the possible DMRS positions when the one-symbol front loaded DMRS and two additional DMRSs are configured. In d20, when the possible region where the PDSCH can be transmitted is configured in the 8th and 9th symbols, the additional DMRS is transmitted via the 4th and 7th symbols. In d21, when the possible region where the PDSCH can be transmitted is configured in the 10th and 11th symbols, the additional DMRS is transmitted via the 5th and 9th symbols. In d22, when the possible region where the PDSCH can be transmitted is configured in the 12th and 13th symbols, the additional DMRS is transmitted via the 6th and 11th symbols.

In FIG. 4B, d30 to d32 indicate possible DMRS positions when the one-symbol front loaded DMRS and three additional DMRSs are configured. The additional DMRS is transmitted via the 4th, 7th, and 10th symbols regardless of the possible region where the PDSCH can be transmitted.

In FIG. 4C, d40 to d42 indicate the possible DMRS positions when the two-symbol front loaded DMRS and one additional DMRS are configured. In d40, when the possible region where the PDSCH can be transmitted is configured in the 8th and 9th symbols, the first symbol of the additional DMRS is transmitted via the 6th symbol. In d41, when the possible region where the PDSCH can be transmitted is configured in the 10th and 11th symbols, the first symbol of the additional DMRS is transmitted via the 8th symbol. In d42, when the possible region where the PDSCH can be transmitted is configured in the 12th and 13th symbols, the first symbol of the additional DMRS is transmitted via the 10th symbol.

Based on the above description, for PDSCH mapping types A and B, the DMRS position can be set as follows according to the first embodiment.

For PDSCH, the reference point for l and the position $l_0$ of the first DM-RS symbol depend on the mapping type. For PDSCH mapping type A
   l is defined relative to the start of the slot
   $l_0=3$ if the higher-layer parameter DL-DMRS-typeA-pos equals 3 and $l_0=2$ otherwise
for PDSCH mapping type B:
   l is defined relative to the start of the scheduled PDSCH resources
   $l_0=0$ Table 3 shows the positions of the front-loaded and additional DMRSs for PDSCH mapping types A and B in the case of a single-symbol DMRS.

TABLE 3

PDSCH DMRS positions for single-symbol DMRS

| Duration of PDSCH transmission | PDSCH mapping type A DL-DMRS-add-pos | | | | PDSCH mapping type B DL-DMRS-add-pos | | | |
|---|---|---|---|---|---|---|---|---|
| | 0 | 1 | 2 | 3 | 0 | 1 | 2 | 3 |
| ≤6 | $l_0$ | — | — | — | $l_0$ | — | — | — |
| 7 | $l_0$ | — | — | — | $l_0$ | $l_0, 4$ | — | — |
| 8 | $l_0$ | — | — | — | $l_0$ | $l_0, 6$ | $l_0, 3, 6$ | — |
| 9 | $l_0$ | $l_0, 7$ | — | — | $l_0$ | $l_0, 6$ | $l_0, 3, 6$ | — |
| 10 | $l_0$ | $l_0, 9$ | $l_0, 6, 9$ | — | $l_0$ | $l_0, 8$ | $l_0, 4, 8$ | $l_0, 3, 6, 9$ |
| 11 | $l_0$ | $l_0, 9$ | $l_0, 6, 9$ | — | $l_0$ | $l_0, 8$ | $l_0, 4, 8$ | $l_0, 3, 6, 9$ |
| 12 | $l_0$ | $l_0, 9$ | $l_0, 6, 9$ | 2, 5, 8, 11 | $l_0$ | $l_0, 10$ | $l_0, 5, 10$ | $l_0, 3, 6, 9$ |
| 13 | $l_0$ | $l_0, 11$ | $l_0, 7, 11$ | 2, 5, 8, 11 | $l_0$ | $l_0, 10$ | $l_0, 5, 10$ | $l_0, 3, 6, 9$ |
| 14 | $l_0$ | $l_0, 11$ | $l_0, 7, 11$ | 2, 5, 8, 11 | $l_0$ | | | |

Table 4 shows the positions of the front-loaded and additional DMRSs for PDSCH mapping types A and B in the case of a double-symbol DMRS.

TABLE 4

PDSCH DMRS positions $\bar{l}$ for double-symbol DMRS

| Duration of PDSCH transmission | PDSCH mapping type A DL-DMRS-add-pos | | | PDSCH mapping type B DL-DMRS-add-pos | | |
|---|---|---|---|---|---|---|
| | 0 | 1 | 2 | 0 | 1 | 2 |
| ≤8 | $l_0$ | — | | $l_0$ | | |
| 8 | $l_0$ | — | | $l_0$ | $l_0, 5$ | |
| 9 | $l_0$ | — | | $l_0$ | $l_0, 5$ | |
| 10 | $l_0$ | $l_0, 8$ | | $l_0$ | $l_0, 7$ | |
| 11 | $l_0$ | $l_0, 8$ | | $l_0$ | $l_0, 7$ | |
| 12 | $l_0$ | $l_0, 8$ | | $l_0$ | $l_0, 9$ | |
| 13 | $l_0$ | $l_0, 10$ | | $l_0$ | $l_0, 9$ | |
| 14 | $l_0$ | $l_0, 10$ | | $l_0$ | | |

Table 5 shows the DMRS time index and possible antenna port numbers for the single-symbol DMRS and double-symbol DMRS.

TABLE 5

PDSCH DMRS time index l' and antenna ports p

| Single or double symbol DM-RS | l' | Supported antenna ports p | |
|---|---|---|---|
| | | Configuration type 1 | Configuration type 2 |
| single | 0 | 1000-1003 | 1000-1005 |
| double | 0, 1 | 1000-1007 | 1000-1011 |

Based on the definition of the DMRS reference point l and the DMRS position information $\bar{l}$ and l' obtained from Tables 3, 4 and 5, the DMRS reference point for the PDSCH is set by $l = \bar{l} + l'$.

Next, in the first embodiment, the DMRS position for the PUSCH (without a hop) in the uplink can be set as follows.
 DMRS position setting for PUSCH (without a hop)
  PUSCH mapping type A
   The position of the front-loaded DMRS is fixed at the 3rd or 4th symbol
   Considering a common DMRS structure for DL or UL, if fixed at the 3rd symbol for DL, it is also fixed at the 3rd symbol for UL, and if fixed at the 4th symbol for DL, it is also fixed at the 4th symbol for UL
   For the position of the additional DMRS, refer to FIGS. 3A to 3D
  PUSCH mapping type B
   The position of the front-loaded DMRS is the first scheduled symbol
   No additional DMRS for 2 or 4 symbol non-slot based scheduling
   For non-slot based scheduling of different symbol lengths including 7 symbol non-slot based scheduling, refer to FIGS. 4A to 4C for the position of the additional DMRS The DMRS position setting for the PUSCH (without a hop) can be divided according to PUSCH mapping types A and B. Specifically, PUSCH mapping type A can be interpreted as a DMRS position setting scheme based on slot-based scheduling, and PUSCH mapping type B can be interpreted as a DMRS position setting scheme based on non-slot based scheduling. The position of the front-loaded DMRS is set differently according to PUSCH mapping type A or B. More specifically, in the case of PUSCH mapping type A, the position of the front-loaded DMRS is fixed at the third or fourth symbol. In the case of PUSCH mapping type B, the position of the front-loaded DMRS is located at the first symbol of the scheduled PDSCH. For PUSCH mapping type A, the position of the front-loaded DMRS and the position of the additional DMRS may be given together as shown in FIGS. 3A to 3D.

In FIGS. 3A to 3D, the portions denoted by 300 indicate the position of a symbol through which the DMRS is transmitted and some of the subcarriers may be used for PUSCH transmission depending on the number of CDM groups used. The portions denoted by 310 indicate a possible region where the PUSCH can be transmitted according to the method proposed in the first embodiment. For example, the actual PUSCH scheduling may be smaller than the region where the PUSCH can be transmitted. The portions denoted by 320 indicate a region where the PUSCH is not transmitted. For example, the 320 portion can be used for SRS transmission and a short PUCCH region. In FIGS. 3A to 3D, the portions denoted by 330 indicate a region where the PDCCH can be transmitted in the case of DL, and this portion can also be used for PUSCH transmission in the case of UL.

FIGS. 3A to 3D show the position where the DMRS is transmitted based on the possible region where the PUSCH can be transmitted according to the method proposed in the first embodiment of the present invention.

In FIGS. 3A and 3B, c10 to c52 indicate possible DMRS positions when the one-symbol front loaded DMRS is configured. In FIG. 3D, c60 to c74 indicate possible DMRS positions when the two-symbol front loaded DMRS is configured.

In FIG. 3A, c10 to c25 indicate possible DMRS positions when the one-symbol front loaded DMRS and one additional DMRS are configured, c10 to c15 indicate possible positions of the additional DMRS when the front loaded DMRS is set at the fourth symbol, and c20 to c25 indicate possible positions of the additional DMRS when the front loaded DMRS is set at the third symbol. More specifically, in c10 and c20, the portion of the slot except for the last five symbols indicated in 320 is the possible region where the PUSCH can be transmitted, and the additional DMRS is transmitted via the 8th symbol. In c11 and c21, the portion of the slot except for the last four symbols indicated in 320 is the possible region where the PUSCH can be transmitted, and the additional DMRS is transmitted via the 10th symbol. In c12 and c22, the portion of the slot except for the last three symbols indicated in 320 is the possible region where the PUSCH can be transmitted, and the additional DMRS is transmitted via the 10th symbol. In c13 and c23, the portion of the slot except for the last two symbols indicated in 320 is the possible region where the PUSCH can be transmitted, and the additional DMRS is transmitted via the 10th symbol. In c14 and c24, the portion of the slot except for the last symbol indicated in 320 is the possible region where the PUSCH can be transmitted, and the additional DMRS is transmitted via the 12th symbol. In c15 and c25, the whole portion of the slot is the possible region where the PUSCH can be transmitted, and the additional DMRS is transmitted via the 12th symbol.

In FIG. 3B, c30 to c44 indicate possible DMRS positions when the one-symbol front loaded DMRS and two additional DMRSs are configured, c30 to c34 indicate possible positions of the additional DMRS when the front loaded DMRS is set at the 4th symbol, and c40 to c44 indicate possible positions of the additional DMRS when the front loaded DMRS is set at the 3rd symbol. More specifically, in c30 and c40, the portion of the slot except for the last four symbols indicated in 320 is the possible region where the PUSCH can be transmitted, and the additional DMRS is transmitted via the 7th and 10th symbols. In c31 and c41, the portion of the slot except for the last three symbols indicated in 320 is the possible region where the PUSCH can be transmitted, and the additional DMRS is transmitted via the 7th and 10th symbols. In c32 and c42, the portion of the slot except for the last two symbols indicated in 320 is the possible region where the PUSCH can be transmitted, and the additional DMRS is transmitted via the 7th and 10th symbols. In c33 and c43, the portion of the slot except for the last symbol indicated in 320 is the possible region where the PUSCH can be transmitted, and the additional DMRS is transmitted via the 8th and 12th symbols. In c34 and c44, the whole portion of the slot is the possible region where the PUSCH can be transmitted, and the additional DMRS is transmitted via the 8th and 12th symbols.

In FIG. 3C, c50 to c52 indicate possible DMRS positions when the one-symbol front loaded DMRS and three additional DMRSs are configured. This is possible when the front loaded DMRS is configured at the 3rd symbol in consideration of the actual usage scenario as shown in FIG. 3C. More specifically, when three additional DMRSs are configured as shown by c50 to c52, the additional DMRS is transmitted via the 6th, 9th, and 12th symbols regardless of the possible region where the PUSCH can be transmitted.

In FIG. 3D, c60 to c74 indicate possible DMRS positions when the two-symbol front loaded DMRS and one additional DMRS are configured. Considering the DMRS overhead and the actual usage scenario, at most one additional DMRS can be configured when the two-symbol front loaded DMRS is configured. In c60 to c64 indicate possible positions of the additional DMRS when the first front loaded DMRS symbol is configured at the 4th symbol. In addition, c70 to c74 indicate possible positions of the additional DMRS when the first front loaded DMRS symbol is configured at the 3rd symbol. More specifically, in c60 and c70, the portion of the slot except for the last four symbols indicated in 320 is the possible region where the PUSCH can be transmitted, and the first symbol of the additional DMRS is transmitted via the 9th symbol. In c61 and c71, the portion of the slot except for the last three symbols indicated in 320 is the possible region where the PUSCH can be transmitted, and the first symbol of the additional DMRS is transmitted via the 9th symbol. In c62 and c72, the portion of the slot except for the last two symbols indicated in 320 is the possible region where the PUSCH can be transmitted, and the first symbol of the additional DMRS is transmitted via the 9th symbol. In c63 and c73, the portion of the slot except for the last symbol indicated in 320 is the possible region where the PUSCH can be transmitted, and the first symbol of the additional DMRS is transmitted via the 11th symbol. In c64 and c74, the whole portion of the slot is the possible region where the PUSCH can be transmitted, and the first symbol of the additional DMRS is transmitted via the 11th symbol.

On the other hand, for PUSCH mapping type B, the position of the front-loaded DMRS is set at the first scheduled symbol. In the case of 2 or 4 symbol non-slot based scheduling, no additional DMRS is configured owing to the short symbol length and DMRS overhead. For non-slot based scheduling of different lengths including 7-symbol non-slot based scheduling, a description is given of the position of the additional DMRS with reference to FIGS. 4A to 4C.

In FIGS. 4A and 4B, d10 to d32 indicate possible DMRS positions when the one-symbol front loaded DMRS is configured. In FIG. 4C, d40 to d42 indicate possible DMRS positions when the two-symbol front loaded DMRS is configured.

In FIG. 4A, d10 to d13 indicate the possible DMRS positions when the one-symbol front loaded DMRS and one additional DMRS are configured. In d10, 1o when the possible region where the PUSCH can be transmitted is configured in the 5th to 7th symbols, the additional DMRS is transmitted via the 5th symbol. In d11, when the possible region where the PUSCH can be transmitted is configured in the 8th and 9th symbols, the additional DMRS is transmitted via the 7th symbol. In d12, when the possible region where the PUSCH can be transmitted is configured in the 10th and 11th symbols, the additional DMRS is transmitted via the 9th symbol. In d13, when the possible region where the PUSCH can be transmitted is configured in the 12th and 13th symbols, the additional DMRS is transmitted via the 11th symbol.

In FIG. 4B, d20 to d22 indicate the possible DMRS positions when the one-symbol front loaded DMRS and two additional DMRSs are configured. In d20, when the possible region where the PUSCH can be transmitted is configured in the 8th and 9th symbols, the additional DMRS is transmitted via the 4th and 7th symbols. In d21, when the possible region where the PUSCH can be transmitted is configured in the 10th and 11th symbols, the additional DMRS is transmitted via the 5th and 9th symbols. In d22, when the possible region where the PUSCH can be transmitted is configured in the 12th and 13th symbols, the additional DMRS is transmitted via the 6th and 11th symbols.

In FIG. 4B, d30 to d32 indicate possible DMRS positions when the one-symbol front loaded DMRS and three additional DMRSs are configured. The additional DMRS is transmitted via the 4th, 7th, and 10th symbols regardless of the possible region where the PUSCH can be transmitted.

In FIG. 4C, d40 to d42 indicate the possible DMRS positions when the two-symbol front loaded DMRS and one additional DMRS are configured. In d40, when the possible region where the PUSCH can be transmitted is configured in the 8th and 9th symbols, the first symbol of the additional DMRS is transmitted via the 6th symbol. In d41, when the possible region where the PUSCH can be transmitted is configured in the 10th and 11th symbols, the first symbol of the additional DMRS is transmitted via the 8th symbol. In d42, when the possible region where the PUSCH can be transmitted is configured in the 12th and 13th symbols, the first symbol of the additional DMRS is transmitted via the 10th symbol. Based on the above description, for PUSCH mapping types A and B, the DMRS position can be set as follows according to the first embodiment.

For PUSCH, the reference point for l and the position $l_0$ of the first DM-RS symbol depend on the mapping type:

for PUSCH mapping type A:
  l is defined relative to the start of the slot
  $l_0=3$ if the higher-layer parameter DL-DMRS-typeA-pos equals 3 and $l_0=2$ otherwise for PUSCH mapping type B:
  l is defined relative to the start of the scheduled PUSCH resources
  $l_0=0$ Table 6 shows the positions of the front-loaded and additional DMRSs for PUSCH mapping types A and B in the case of a single-symbol DMRS.

TABLE 6

PUSCH DMRS positions $\bar{l}$ for single-symbol DMRS

| PUSCH duration in symbols | DM-RS positions $\bar{l}$ | | | | | | | |
|---|---|---|---|---|---|---|---|---|
| | PUSCH mapping type A DL-DMRS-add-pos | | | | PUSCH mapping type B DL-DMRS-add-pos | | | |
| | 0 | 1 | 2 | 3 | 0 | 1 | 2 | 3 |
| ≤7 | $l_0$ | — | — | — | $l_0$ | $l_0$, 4 | — | — |
| 8 | $l_0$ | — | — | — | $l_0$ | $l_0$, 6 | $l_0$, 3, 6 | — |
| 9 | $l_0$ | $l_0$, 7 | — | — | $l_0$ | $l_0$, 6 | $l_0$, 3, 6 | — |
| 10 | $l_0$ | $l_0$, 9 | $l_0$, 6, 9 | — | $l_0$ | $l_0$, 8 | $l_0$, 4, 8 | $l_0$, 3, 6, 9 |
| 11 | $l_0$ | $l_0$, 9 | $l_0$, 6, 9 | — | $l_0$ | $l_0$, 8 | $l_0$, 4, 8 | $l_0$, 3, 6, 9 |
| 12 | $l_0$ | $l_0$, 9 | $l_0$, 6, 9 | 2, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | 2, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | 2, 5, 8, 11 | — | — | — | — |

Table 7 shows the positions of the front-loaded and additional DMRSs for PUSCH mapping types A and B in the case of a double-symbol DMRS.

TABLE 7

PUSCH DMRS positions $\bar{l}$ for double-symbol DMRS

| PUSCH duration in symbols | DM-RS positions $\bar{l}$ | | | | | | | |
|---|---|---|---|---|---|---|---|---|
| | PUSCH mapping type A DL-DMRS-add-pos | | | | PUSCH mapping type B DL-DMRS-add-pos | | | |
| | 0 | 1 | 2 | 3 | 0 | 1 | 2 | 3 |
| ≤7 | $l_0$ | — | | | $l_0$ | — | | |
| 8 | $l_0$ | — | | | $l_0$ | $l_0$, 5 | | |
| 9 | $l_0$ | — | | | $l_0$ | $l_0$, 5 | | |
| 10 | $l_0$ | $l_0$, 8 | | | $l_0$ | $l_0$, 7 | | |
| 11 | $l_0$ | $l_0$, 8 | | | $l_0$ | $l_0$, 7 | | |
| 12 | $l_0$ | $l_0$, 8 | | | $l_0$ | $l_0$, 9 | | |
| 13 | $l_0$ | $l_0$, 10 | | | $l_0$ | $l_0$, 9 | | |
| 14 | $l_0$ | $l_0$, 10 | | | — | — | | |

Table 8 shows the DMRS time index and possible antenna port numbers for the single-symbol DMRS and double-symbol DMRS.

TABLE 8

PUSCH DMRS time index l' and antenna ports p

| DM-RS duration | l' | Supported antenna ports p | |
|---|---|---|---|
| | | Configuration type 1 | Configuration type 2 |
| single-symbol DM-RS | 0 | 1000-1003 | 1000-1005 |
| double-symbol DM-RS | 0, 1 | 1000-1007 | 1000-1011 |

Based on the definition of the DMRS reference point l and the DMRS position information $\bar{l}$ and l' obtained from Tables 1, 2 and 3, the DMRS reference point for the PDSCH is set by $l=\bar{l}+l'$.

Hereinabove, a description is given of the DMRS position setting method for the PUSCH (without a hop). Next, for the PUSCH (with a hop), the DMRS position can be set as follows.

DMRS position setting for PUSCH (with a hop)
First hop
  PUSCH mapping type A
    The position of the one-symbol front loaded DMRS is fixed at the 3rd or 4th symbol
    If 5 or more symbols are scheduled relative to the front-loaded DMRS, the position of the additional DMRS is at the 5th symbol relative to the front-loaded DMRS. Otherwise, no additional DMRS is used
  PUSCH mapping type B
    The position of the front-loaded DMRS is the first scheduled symbol
    If 5 or more symbols are scheduled relative to the front-loaded DMRS, the position of the additional DMRS is at the 5th symbol relative to the front-loaded DMRS. Otherwise, no additional DMRS is used
Second hop
  The position of the front-loaded DMRS is at the first symbol of the PUSCH corresponding to the second hop
  If 5 or more symbols are scheduled relative to the front-loaded DMRS corresponding to the second hop, the position of the additional DMRS is at the 5th symbol relative to the front-loaded DMRS. Otherwise, no additional DMRS is used
The same DMRS position is configured for both CP-OFDM and DFT-S-OFDM As described in the first embodiment, when the DMRS position setting is determined according to the DL or UL symbol length assignable to the slot, if the actual scheduled PDSCH or PUSCH region is smaller than the assignable PDSCH or PUSCH region, there may be a problem in configuring the DMRS position. For example, in c15 of FIG. 3A, an ambiguity about the additional DMRS occurs when the PDSCH is scheduled ahead of the 12th symbol where the additional DMRS is to be transmitted. In such a case, the following scheme can be considered.

Handling ambiguity about additional DMRS when actual scheduling is smaller than PDSCH or PUSCH region.
  Alternative-1: the UE does not expect to be configured with such a scenario.
  Alternative-2: if the UE has been configured with X additional DMRSs and if the PDSCH/PUSCH size is smaller than the minimum size that has been specified (See Table 1,2,4,5), then a DMRS pattern with X−1 additional DMRSs will be used. The UE does not expect to be configured with any other scenario.

Alternative-3: the number of additional DMRSs is determined to be the maximum number of additional DMRSs, which the PDSCH/PUSCH region supports (See Tables 1,2,4,5).

Referring to c15 of FIG. 3A, in Alternative 1, the UE does not expect the PDSCH or the PUSCH to be scheduled ahead of the 12th symbol. This places a restriction on scheduling. That is, when DMRS information is configured as in c15 of FIG. 3A, there is a restriction that scheduling of the PDSCH or PUSCH should include up to the 12th symbol. In Alternative 2, if the PDSCH or PUSCH is scheduled ahead of the 12th symbol in c15 of FIG. 3A, the additional DMRS located at the 12th symbol is punctured and only the DMRS in the scheduled region is utilized. In Alternative 3, if the PDSCH or PUSCH is scheduled up to the 11th symbol in c15 of FIG. 3A, the additional DMRS is assumed to be located at the 10th symbol as shown in c13 of FIG. 3A.

In the first embodiment, the DMRS position setting is determined according to the DL or UL symbol length assignable to the slot. The DMRS information can be configured as follows. In the NR system, the DMRS-related information can be identified through the physical broadcast channel (PBCH), radio resource control (RRC), group common DCI, and UE-specific DCI, and each signaling may include the following information.

When the position of the front-loaded DMRS is fixed at the 3rd or 4th symbol through the PBCH, receive an indication of whether the front-loaded DMRS is located at the 3rd symbol or at the 4th symbol Slot format indication (SFI) information can be configured via cell-specific RRC, and the SFI information is notified via system information (SIB2)

The SFI information may be configured and notified via UE-specific RRC

The SFI information may be dynamically configured and notified via group common DCI Some or all of the following information may be configured and received via UE specific DCI Information about PDSCH mapping types A and B/PUSCH mapping types A and B Indication of mapping type A or B PDSCH or PUSCH scheduling information Start position and duration of PDSCH or PUSCH Indication of DMRS port information Scheduled DMRS port information Number of CDM groups scheduled together for PDSCH rate matching Indication of whether front-loaded DMRS is one-symbol DMRS or two-symbol DMRS Frequency hopping enabling or disabling Prior to RRC setup, the DMRS configuration for PDSCH or PUSCH is subdivided as follows according to the configured SFI information and DCI scheduling information DMRS pattern is assumed to be DMRS-config-type 1

In the case of slot-based scheduling, a one-symbol front-loaded DMRS and two additional DMRSs are configured by default; for their positions, refer to PDSCH mapping type A in Table 3 (for PDSCH DMRS) and PUSCH mapping type A in Table 6 (for PUSCH DMRS).

In the case of 2 or 4-symbol non-slot-based scheduling, only the one-symbol front-loaded DMRS is configured and no additional DMRS is configured.

In the case of non-slot based scheduling of different symbol lengths including 7-symbol non-slot based scheduling, a single-symbol front-loaded DMRS and one single-symbol additional DMRS are configured; for their positions, refer to PDSCH mapping type B in Table 3 (for PDSCH DMRS) and PUSCH mapping type B in Table 6 (for PUSCH DMRS).

In the case of PUSCH (with a hop), Mode 1 (intra-slot FH only) is assumed when frequency hopping is enabled by the DCI, and no additional DMRS is configured for PUSCH mapping type A and the additional DMRS is configured by default for PUSCH mapping type B.

If the actual scheduling is smaller than the PDSCH or PUSCH region, one of the proposed methods can be considered to resolve the ambiguity about the additional DMRS.

Prior to RRC setup, PDSCH DMRS transmission is allowed only for single-user multi-input-multi-output (SU-MIMO) with DMRS port 0, and FDM between the PDSCH symbol and the DMRS symbol is not allowed for slot-based scheduling and 4 or 7-symbol non-slot-based scheduling. However, FDM between the PDSCH symbol and the DMRS symbol is allowed for 2-symbol non-slot-based scheduling.

Prior to RRC setup, PUSCH DMRS transmission is allowed only for SU-MIMO with DMRS port 0, and FDM between the PDSCH symbol and the DMRS symbol is not allowed.

After RRC setup, the DMRS configuration for PDSCH or PUSCH is subdivided as follows according to the DMRS information configured via RRC, configured SFI information, and DCI scheduling information DMRS information configured via RRC DMRS configuration type (DMRS-config-type)

DMRS-config-type=1 or 2

The maximum number of the front-loaded DMRS symbols (DMRS-max-len)

DMRS-max-len=1 or 2

The number of additional DMRS symbols (DMRS-add-pos)

DMRS-add-pos=0,1,2,3

Frequency hopping (FH) mode is set to one of the followings

Mode1: intra-slot FH only

Mode2: inter-slot FH only

If the actual scheduling is smaller than the PDSCH or PUSCH region, one of the proposed methods can be considered to resolve the ambiguity about the additional DMRS.

Next, the second embodiment proposes another method for resolving the ambiguity about the additional DMRS described above.

Second Embodiment

A method for determining the DMRS position described above according to the actually scheduled DL or UL symbol length is provided in the present disclosure. In the second embodiment, the DMRS position for the PDSCH in the downlink is set as follows.

DMRS position setting for PDSCH

PDSCH mapping type A

The position of the front-loaded DMRS is fixed at the 3rd or 4th symbol

For the position of the additional DMRS, refer to FIGS. 3A to 3D

PDSCH mapping type B
  The position of the front-loaded DMRS is the first scheduled symbol
  No additional DMRS for 2 or 4-symbol non-slot based scheduling
  For non-slot based scheduling of different symbol lengths including 7-symbol non-slot based scheduling, refer to FIGS. 4A to 4C for the position of the additional DMRS The DMRS position setting for the PDSCH can be divided according to PDSCH mapping types A and B. Specifically, PDSCH mapping type A can be interpreted as a DMRS position setting scheme based on slot-based scheduling, and PDSCH mapping type B can be interpreted as a DMRS position setting scheme based on non-slot based scheduling. The position of the front-loaded DMRS is set differently according to PDSCH mapping type A or B. More specifically, in the case of PDSCH mapping type A, the position of the front-loaded DMRS is fixed at the third or fourth symbol. In the case of PDSCH mapping type B, the position of the front-loaded DMRS is located at the first symbol of the scheduled PDSCH. For PDSCH mapping type A, the position of the front-loaded DMRS and the position of the additional DMRS are shown together in FIGS. 3A to 3D.

In FIGS. 3A to 3D, the 300 portion indicates the position of a symbol through which the DMRS is transmitted and some of the subcarriers may be used for PDSCH transmission depending on the number of CDM groups used. The 310b portion indicates a region where the PDSCH is scheduled according to the method proposed in the second embodiment. The 320 portion indicates a region where the PDSCH is not transmitted. For example, the 320 portion can be used for the PUSCH region. In FIGS. 3A to 3D, the 330 portion indicates a region where the PDCCH can be transmitted in the case of DL, and this portion can also be used for PDSCH transmission if the PDCCH is not transmitted.

With reference to FIGS. 3A to 3D, a description is given of the position where the DMRS is transmitted based on the region where the PDSCH is actually scheduled according to the method proposed in the second embodiment. In FIGS. 3A and 3B, c10 to c52 indicate possible DMRS positions when the one-symbol front loaded DMRS is configured. In FIG. 3D, c60 to c74 indicate possible DMRS positions when the two-symbol front loaded DMRS is configured.

In FIG. 3A, c10 to c25 indicate possible DMRS positions when the one-symbol front loaded DMRS and one additional DMRS are configured, c10 to c15 indicate possible positions of the additional DMRS when the front loaded DMRS is set at the 4th symbol, and c20 to c25 indicate possible positions of the additional DMRS when the front loaded DMRS is set at the 3rd symbol. More specifically, in c10 and c20, the portion of the slot except for the last five symbols indicated in 320 is the region where the PDSCH is scheduled, and the additional DMRS is transmitted via the 8th symbol. In c11 and c21, the portion of the slot except for the last four symbols indicated in 320 is the region where the PDSCH is scheduled, and the additional DMRS is transmitted via the 10th symbol. In c12 and c22, the portion of the slot except for the last three symbols indicated in 320 is the region where the PDSCH is scheduled, and the additional DMRS is transmitted via the 10th symbol. In c13 and c23, the portion of the slot except for the last two symbols indicated in 320 is the region where the PDSCH is scheduled, and the additional DMRS is transmitted via the 10th symbol. In c14 and c24, the portion of the slot except for the last symbol indicated in 320 is the region where the PDSCH is scheduled, and the additional DMRS is transmitted via the 12th symbol. In c15 and c25, the whole portion of the slot is the region where the PDSCH is scheduled, and the additional DMRS is transmitted via the 12th symbol.

In FIG. 3B, c30 to c44 indicate possible DMRS positions when the one-symbol front loaded DMRS and two additional DMRSs are configured, c30 to c34 indicate possible positions of the additional DMRS when the front loaded DMRS is set at the 4th symbol, and c40 to c44 indicate possible positions of the additional DMRS when the front loaded DMRS is set at the 3rd symbol. More specifically, in c30 and c40, the portion of the slot except for the last four symbols indicated in 320 is the region where the PDSCH is scheduled, and the additional DMRS is transmitted via the 7th and 10th symbols. In c31 and c41, the portion of the slot except for the last three symbols indicated in 320 is the region where the PDSCH is scheduled, and the additional DMRS is transmitted via the 7th and 10th symbols. In c32 and c42, the portion of the slot except for the last two symbols indicated in 320 is the region where the PDSCH is scheduled, and the additional DMRS is transmitted via the 7th and 10th symbols. In c33 and c43, the portion of the slot except for the last symbol indicated in 320 is the region where the PDSCH is scheduled, and the additional DMRS is transmitted via the 8th and 12th symbols. In c34 and c44, the whole portion of the slot is the region where the PDSCH is scheduled, and the additional DMRS is transmitted via the 8th and 12th symbols.

In FIG. 3C, c50 to c52 indicate possible DMRS positions when the one-symbol front loaded DMRS and three additional DMRSs are configured. This is possible only when the front loaded DMRS is configured at the 3rd symbol in consideration of the actual usage scenario as shown in FIG. 3C. More specifically, when three additional DMRSs are configured as in c50 to c52, the additional DMRS is transmitted via the 6th, 9th, and 12th symbols regardless of the region where the PDSCH is scheduled.

In FIG. 3D, c60 to c74 indicate possible DMRS positions when the two-symbol front loaded DMRS and one additional DMRS are configured. Considering the DMRS overhead and the actual usage scenario, at most one additional DMRS can be configured when the two-symbol front loaded DMRS is configured. In FIG. 3D, c60 to c64 indicate possible positions of the additional DMRS when the first front loaded DMRS symbol is configured at the 4th symbol. In FIG. 3D, c70 to c74 indicate possible positions of the additional DMRS when the first front loaded DMRS symbol is configured at the 3rd symbol. More specifically, in c60 and c70, the portion of the slot except for the last four symbols indicated in 320 is the region where the PDSCH is scheduled, and the first symbol of the additional DMRS is transmitted via the 9th symbol. In c61 and c71, the portion of the slot except for the last three symbols indicated in 320 is the region where the PDSCH is scheduled, and the first symbol of the additional DMRS is transmitted via the 9th symbol. In c62 and c72, the portion of the slot except for the last two symbols indicated in 320 is the region where the PDSCH is scheduled, and the first symbol of the additional DMRS is transmitted via the 9th symbol. In c63 and c73, the portion of the slot except for the last symbol indicated in 320 is the region where the PDSCH is scheduled, and the first symbol of the additional DMRS is transmitted via the 11th symbol. In c64 and c74, the whole portion of the slot is the region where the PDSCH is scheduled, and the first symbol of the additional DMRS is transmitted via the 11th symbol.

On the other hand, for PDSCH mapping type B, the position of the front-loaded DMRS is set at the first scheduled symbol. In the case of 2 or 4 symbol non-slot based scheduling, no additional DMRS is configured owing to the short symbol length and DMRS overhead. For non-slot based scheduling of different lengths including 7-symbol non-slot based scheduling, a description is given of the position of the additional DMRS with reference to FIGS. 4A to 4C. In FIGS. 4A and 4B, d10 to d32 indicate possible DMRS positions when the one-symbol front loaded DMRS is configured. In FIG. 4C, d40 to d42 indicate possible DMRS positions when the two-symbol front loaded DMRS is configured.

In FIG. 4A, d10 to d13 indicate the possible DMRS positions when the one-symbol front loaded DMRS and one additional DMRS are configured. In d10, when the region where the PDSCH is scheduled is configured in the 5th to 7th symbols, the additional DMRS is transmitted via the 5th symbol. In d11, when the region where the PDSCH is scheduled is configured in the 8th and 9th symbols, the additional DMRS is transmitted via the 7th symbol. In d12, when the region where the PDSCH is scheduled is configured in the 10th and 11th symbols, the additional DMRS is transmitted via the 9th symbol. In d13, when the region where the PDSCH is scheduled is configured in the 12th and 13th symbols, the additional DMRS is transmitted via the 11th symbol.

In FIG. 4B, d20 to d22 indicate the possible DMRS positions when the one-symbol front loaded DMRS and two additional DMRSs are configured. In d20, when the region where the PDSCH is scheduled is configured in the 8th and 9th symbols, the additional DMRS is transmitted via the 4th and 7th symbols. In d21, when the region where the PDSCH is scheduled is configured in the 10th and 11th symbols, the additional DMRS is transmitted via the 5th and 9th symbols. In d22, when the region where the PDSCH is scheduled is configured in the 12th and 13th symbols, the additional DMRS is transmitted via the 6th and 11th symbols.

In FIG. 4B, d30 to d32 indicate possible DMRS positions when the one-symbol front loaded DMRS and three additional DMRSs are configured. In this case, the additional DMRS is transmitted via the 4th, 7th, and 10th symbols regardless of the region where the PDSCH is scheduled.

In FIG. 4C, d40 to d42 indicate the possible DMRS positions when the two-symbol front loaded DMRS and one additional DMRS are configured. In d40, when the region where the PDSCH is scheduled is configured in the 8th and 9th symbols, the first symbol of the additional DMRS is transmitted via the 6th symbol. In d41, when the region where the PDSCH is scheduled is configured in the 10th and 11th symbols, the first symbol of the additional DMRS is transmitted via the 8th symbol. In d42, when the region where the PDSCH is scheduled is configured in the 12th and 13th symbols, the first symbol of the additional DMRS is transmitted via the 10th symbol.

Based on the above description, for PDSCH mapping types A and B, the DMRS position can be set as follows according to the second embodiment.

For PDSCH, the reference point for l and the position $l_0$ of the first DM-RS symbol depend on the mapping type:

for PDSCH mapping type A:
  l is defined relative to the start of the slot
  $l_0=3$ if the higher-layer parameter DL-DMRS-typeA-pos equals 3 and $l_0=2$ otherwise
  PUSCH scheduling start point should be located earlier than $l_0$
  PUSCH scheduling ending point should be same or later than $l_0$ for PDSCH mapping type B:
  l is defined relative to the start of the scheduled PDSCH resources
  $l_0=0$ Table 9 shows the positions of the front-loaded and additional DMRSs for PDSCH mapping types A and B in the case of a single-symbol DMRS.

TABLE 9

PDSCH DMRS positions Ī for single-symbol DMRS

| Duration of scheduled PDSCH symbols | DM-RS positions Ī | | | | | | | |
|---|---|---|---|---|---|---|---|---|
| | PDSCH mapping type A DL-DMRS-add-pos | | | | PDSCH mapping type B DL-DMRS-add-pos | | | |
| | 0 | 1 | 2 | 3 | 0 | 1 | 2 | 3 |
| ≤6 | $l_0$ | — | — | — | $l_0$ | | | |
| 7 | $l_0$ | — | — | — | $l_0$ | $l_0$, 4 | | |
| 8 | $l_0$ | — | — | — | $l_0$ | $l_0$, 6 | $l_0$, 3, 6 | — |
| 9 | $l_0$ | $l_0$, 7 | — | — | $l_0$ | $l_0$, 6 | $l_0$, 3, 6 | — |
| 10 | $l_0$ | $l_0$, 9 | $l_0$, 6, 9 | — | $l_0$ | $l_0$, 8 | $l_0$, 4, 8 | $l_0$, 3, 6, 9 |
| 11 | $l_0$ | $l_0$, 9 | $l_0$, 6, 9 | — | $l_0$ | $l_0$, 8 | $l_0$, 4, 8 | $l_0$, 3, 6, 9 |
| 12 | $l_0$ | $l_0$, 9 | $l_0$, 6, 9 | 2, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | 2, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | 2, 5, 8, 11 | $l_0$ | | | |

Table 10 shows the positions of the front-loaded and additional DMRSs for PDSCH mapping types A and B in the case of a double-symbol DMRS.

TABLE 10

PDSCH DMRS positions Ī for double-symbol DMRS

| Duration of scheduled PDSCH symbols | DM-RS positions Ī | | | | | |
|---|---|---|---|---|---|---|
| | PDSCH mapping type A DL-DMRS-add-pos | | | PDSCH mapping type B DL-DMRS-add-pos | | |
| | 0 | 1 | 2 | 0 | 1 | 2 |
| ≤8 | $l_0$ | — | | $l_0$ | | |
| 8 | $l_0$ | — | | $l_0$ | $l_0$, 5 | |
| 9 | $l_0$ | — | | $l_0$ | $l_0$, 5 | |
| 10 | $l_0$ | $l_0$, 8 | | $l_0$ | $l_0$, 7 | |
| 11 | $l_0$ | $l_0$, 8 | | $l_0$ | $l_0$, 7 | |
| 12 | $l_0$ | $l_0$, 8 | | $l_0$ | $l_0$, 9 | |
| 13 | $l_0$ | $l_0$, 10 | | $l_0$ | $l_0$, 9 | |
| 14 | $l_0$ | $l_0$, 10 | | $l_0$ | | |

Table 11 shows the DMRS time index and possible antenna port numbers for the single-symbol DMRS and double-symbol DMRS.

TABLE 11

PDSCH DMRS time index l' and antenna ports p

| Single or double symbol DM-RS | l' | Supported antenna ports p | |
|---|---|---|---|
| | | Configuration type 1 | Configuration type 2 |
| single | 0 | 1000-1003 | 1000-1005 |
| double | 0, 1 | 1000-1007 | 1000-1011 |

Based on the definition of the DMRS reference point l and the DMRS position information $\bar{l}$ and l' obtained from Tables 7, 8 and 9, the DMRS reference point for the PDSCH is set by l=$\bar{l}$+l'.

Next, in the second embodiment, the DMRS position for the PUSCH (without a hop) in the uplink can be set as follows.

DMRS position setting for PUSCH (without a hop)
PUSCH mapping type A
  The position of the front-loaded DMRS is fixed at the 3rd or 4th symbol
    Considering a common DMRS structure for DL and UL, if fixed at the 3rd symbol for DL, it is also fixed at the 3rd symbol for UL, and if fixed at the 4th symbol for DL, it is also fixed at the 4th symbol for UL
  For the position of the additional DMRS, refer to FIGS. 3A to 3D
PUSCH mapping type B
  The position of the front-loaded DMRS is the first scheduled symbol
  No additional DMRS for 2 or 4 symbol non-slot based scheduling
  For non-slot based scheduling of different symbol lengths including 7-symbol non-slot based scheduling, refer to FIGS. 4A to 4C for the position of the additional DMRS The DMRS position setting for the PUSCH (without a hop) can be divided according to PUSCH mapping types A and B. Specifically, PUSCH mapping type A can be interpreted as a DMRS position setting scheme based on slot-based scheduling, and PUSCH mapping type B can be interpreted as a DMRS position setting scheme based on non-slot based scheduling. The position of the front-loaded DMRS is set differently according to PUSCH mapping type A or B. More specifically, in the case of PUSCH mapping type A, the position of the front-loaded DMRS is fixed at the 3rd or 4th symbol. In the case of PUSCH mapping type B, the position of the front-loaded DMRS is located at the first symbol of the scheduled PDSCH. For PUSCH mapping type A, the position of the front-loaded DMRS and the position of the additional DMRS may be given together as shown in FIGS. 3A to 3D.

In FIGS. 3A to 3D, the 300 portion indicates the position of a symbol through which the DMRS is transmitted and some of the subcarriers may be used for PUSCH transmission depending on the number of CDM groups used. The 310*b* portion indicates the region where the PUSCH is scheduled according to the method proposed in the second embodiment. The 320 portion indicates a region where the PUSCH is not transmitted. For example, the 320 portion can be used for SRS transmission and a short PUCCH region. The 330 portion indicates a region where the PDCCH can be transmitted in the case of DL, and this portion can also be used for PUSCH transmission in the case of UL.

With reference to FIGS. 3A to 3D, a description is given of the position where the DMRS is transmitted based on the region where the PUSCH is scheduled according to the method proposed in the second embodiment of the present invention. In FIG. 3A, c10 to c25 indicate possible DMRS positions when the one-symbol front loaded DMRS is configured. In FIG. 3D, c60 to c74 indicate possible DMRS positions when the two-symbol front loaded DMRS is configured.

In FIG. 3A, c10 to c25 indicate possible DMRS positions when the one-symbol front loaded DMRS and one additional DMRS are configured, c10 to c15 indicate possible positions of the additional DMRS when the front loaded DMRS is set at the 4th symbol, and c20 to c25 indicate possible positions of the additional DMRS when the front loaded DMRS is set at the 3rd symbol. More specifically, in c10 and c20, the portion of the slot except for the last five symbols indicated in 320 is the region where the PUSCH is scheduled, and the additional DMRS is transmitted via the 8th symbol. In c11 and c21, the portion of the slot except for the last four symbols indicated in 320 is the region where the PUSCH is scheduled, and the additional DMRS is transmitted via the 10th symbol. In c12 and c22, the portion of the slot except for the last three symbols indicated in 320 is the region where the PUSCH is scheduled, and the additional DMRS is transmitted via the 10th symbol. In c13 and c23, the portion of the slot except for the last two symbols indicated in 320 is the region where the PUSCH is scheduled, and the additional DMRS is transmitted via the 10th symbol. In c14 and c24, the portion of the slot except for the last symbol indicated in 320 is the region where the PUSCH is scheduled, and the additional DMRS is transmitted via the 12th symbol. In c15 and c25, the whole portion of the slot is the region where the PUSCH is scheduled, and the additional DMRS is transmitted via the 12th symbol.

In FIG. 3B, c30 to c44 indicate possible DMRS positions when the one-symbol front loaded DMRS and two additional DMRSs are configured, c30 to c34 indicate possible positions of the additional DMRS when the front loaded DMRS is set at the 4th symbol, and c40 to c44 indicate possible positions of the additional DMRS when the front loaded DMRS is set at the 3rd symbol. More specifically, in c30 and c40, the portion of the slot except for the last four symbols indicated in 320 is the region where the PUSCH is scheduled, and the additional DMRS is transmitted via the 7th and 10th symbols. In c31 and c41, the portion of the slot except for the last three symbols indicated in 320 is the region where the PUSCH is scheduled, and the additional DMRS is transmitted via the 7th and 10th symbols. In c32 and c42, the portion of the slot except for the last two symbols indicated in 320 is the region where the PUSCH is scheduled, and the additional DMRS is transmitted via the 7th and 10th symbols. In c33 and c43, the portion of the slot except for the last symbol indicated in 320 is the region where the PUSCH is scheduled, and the additional DMRS is transmitted via the 8th and 12th symbols. In c34 and c44, the whole portion of the slot is the region where the PUSCH is scheduled, and the additional DMRS is transmitted via the 8th and 12th symbols.

In FIG. 3C, c50 to c52 indicate possible DMRS positions when the one-symbol front loaded DMRS and three additional DMRSs are configured. This is possible only when the front loaded DMRS is configured at the 3rd symbol in consideration of the actual usage scenario as shown in FIG. 3C. More specifically, when three additional DMRSs are configured as in c50 to c52, the additional DMRS is transmitted via the 6th, 9th, and 12th symbols regardless of the region where the PUSCH is scheduled.

In FIG. 3D, c60 to c74 indicate possible DMRS positions when the two-symbol front loaded DMRS and one additional DMRS are configured. Considering the DMRS overhead and the actual usage scenario, at most one additional DMRS can be configured when the two-symbol front loaded DMRS is configured. In FIG. 3D, c60 to c64 indicate possible positions of the additional DMRS when the first front loaded DMRS symbol is configured at the 4th symbol. In FIG. 3D, c70 to c74 indicate possible positions of the additional DMRS when the first front loaded DMRS symbol is configured at the 3rd symbol. More specifically, in c60 and c70, the portion of the slot except for the last four symbols indicated in 320 is the region where the PUSCH is scheduled, and the first symbol of the additional DMRS is transmitted via the 9th symbol. In c61 and c71, the portion of the slot except for the last three symbols indicated in 320 is the region where the PUSCH is scheduled, and the first symbol of the additional DMRS is transmitted via the 9th symbol. In c62 and c72, the portion of the slot except for the last two symbols indicated in 320 is the region where the PUSCH is scheduled, and the first symbol of the additional DMRS is transmitted via the 9th symbol. In c63 and c73, the portion of the slot except for the last symbol indicated in 320 is the region where the PUSCH is scheduled, and the first symbol of the additional DMRS is transmitted via the 11th symbol. In c64 and c74, the whole portion of the slot is the region where the PUSCH is scheduled, and the first symbol of the additional DMRS is transmitted via the 11th symbol.

On the other hand, for PUSCH mapping type B, the position of the front-loaded DMRS is set at the first scheduled symbol. In the case of 2 or 4 symbol non-slot based scheduling, no additional DMRS is configured owing to the short symbol length and DMRS overhead. For non-slot based scheduling of different lengths including 7-symbol non-slot based scheduling, a description is given of the position of the additional DMRS with reference to FIGS. 4A to 4C. In FIGS. 4A and 4B, d10 to d32 indicate possible DMRS positions when the one-symbol front loaded DMRS is configured. In FIG. 4C, d40 to d42 indicate possible DMRS positions when the two-symbol front loaded DMRS is configured.

In FIG. 4A, d10 to d13 indicate the possible DMRS positions when the one-symbol front loaded DMRS and one additional DMRS are configured. In d10, when the region where the PUSCH is scheduled is configured in the 5th to 7th symbols, the additional DMRS is transmitted via the 5th symbol. In d11, when the region where the PUSCH is scheduled is configured in the 8th and 9th symbols, the additional DMRS is transmitted via the 7th symbol. In d12, when the region where the PUSCH is scheduled is configured in the 10th and 11th symbols, the additional DMRS is transmitted via the 9th symbol. In d13, when the region where the PUSCH is scheduled is configured in the 12th and 13th symbols, the additional DMRS is transmitted via the 11th symbol.

In FIG. 4B, d20 to d22 indicate the possible DMRS positions when the one-symbol front loaded DMRS and two additional DMRSs are configured. In d20, when the region where the PUSCH is scheduled is configured in the 8th and 9th symbols, the additional DMRS is transmitted via the 4th and 7th symbols. In d21, when the region where the PUSCH is scheduled is configured in the 10th and 11th symbols, the additional DMRS is transmitted via the 5th and 9th symbols. In d22, when the region where the PUSCH is scheduled is configured in the 12th and 13th symbols, the additional DMRS is transmitted via the 6th and 11th symbols.

In FIG. 4B, d30 to d32 indicate possible DMRS positions when the one-symbol front loaded DMRS and three additional DMRSs are configured. In this case, the additional DMRS is transmitted via the 4th, 7th, and 10th symbols regardless of the region where the PUSCH is scheduled.

In FIG. 4C, d40 to d42 indicate the possible DMRS positions when the two-symbol front loaded DMRS and one additional DMRS are configured. In d40, when the region where the PUSCH is scheduled is configured in the 8th and 9th symbols, the first symbol of the additional DMRS is transmitted via the 6th symbol. In d41, when the region where the PUSCH is scheduled is configured in the 10th and 11th symbols, the first symbol of the additional DMRS is transmitted via the 8th symbol. In d42, when the region where the PUSCH is scheduled is configured in the 12th and 13th symbols, the first symbol of the additional DMRS is transmitted via the 10th symbol.

Based on the above description, for PUSCH mapping types A and B, the DMRS position can be set as follows according to the second embodiment.

For PUSCH, the reference point for l and the position of the first DM-RS symbol depend on the mapping type:

for PUSCH mapping type A:
  l is defined relative to the start of the slot
  $l_0=3$ if the higher-layer parameter DL-DMRS-typeA-pos equals 3 and $l_0=2$ otherwise
  PUSCH scheduling start point should be located earlier than
  PUSCH scheduling ending point should be same or later than for PUSCH mapping type B:
  l is defined relative to the start of the scheduled PUSCH resources
  $l_0=0$ Table 12 shows the positions of the front-loaded and additional DMRSs for PUSCH mapping types A and B in the case of a single-symbol DMRS.

TABLE 12

| Duration of scheduled PDSCH symbols | PUSCH DMRS positions $\bar{l}$ for single-symbol DMRS | | | | | | | |
|---|---|---|---|---|---|---|---|---|
| | DM-RS positions $\bar{l}$ | | | | | | | |
| | PUSCH mapping type A DL-DMRS-add-pos | | | | PUSCH mapping type B DL-DMRS-add-pos | | | |
| | 0 | 1 | 2 | 3 | 0 | 1 | 2 | 3 |
| ≤7 | $l_0$ | — | — | — | $l_0$ | $l_0$, 4 | — | — |
| 8 | $l_0$ | — | — | — | $l_0$ | $l_0$, 6 | $l_0$, 3, 6 | — |
| 9 | $l_0$ | $l_0$, 7 | — | — | $l_0$ | $l_0$, 6 | $l_0$, 3, 6 | — |
| 10 | $l_0$ | $l_0$, 9 | $l_0$, 6, 9 | — | $l_0$ | $l_0$, 8 | $l_0$, 4, 8 | $l_0$, 3, 6, 9 |
| 11 | $l_0$ | $l_0$, 9 | $l_0$, 6, 9 | — | $l_0$ | $l_0$, 8 | $l_0$, 4, 8 | $l_0$, 3, 6, 9 |
| 12 | $l_0$ | $l_0$, 9 | $l_0$, 6, 9 | 2, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | 2, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | 2, 5, 8, 11 | — | — | — | — |

Table 13 shows the positions of the front-loaded and additional DMRSs for PUSCH mapping types A and B in the case of a double-symbol DMRS.

TABLE 13

| Duration of scheduled PDSCH symbols | PUSCH DMRS positions $\bar{l}$ for double-symbol DMRS | | | | | | | |
|---|---|---|---|---|---|---|---|---|
| | DM-RS positions $\bar{l}$ | | | | | | | |
| | PUSCH mapping type A DL-DMRS-add-pos | | | | PUSCH mapping type B DL-DMRS-add-pos | | | |
| | 0 | 1 | 2 | 3 | 0 | 1 | 2 | 3 |
| ≤7 | $l_0$ | — | | | $l_0$ | — | | |
| 8 | $l_0$ | — | | | $l_0$ | $l_0$, 5 | | |
| 9 | $l_0$ | — | | | $l_0$ | $l_0$, 5 | | |
| 10 | $l_0$ | $l_0$, 8 | | | $l_0$ | $l_0$, 7 | | |
| 11 | $l_0$ | $l_0$, 8 | | | $l_0$ | $l_0$, 7 | | |

TABLE 13-continued

PUSCH DMRS positions $\bar{l}$ for double-symbol DMRS

| Duration of scheduled PDSCH symbols | DM-RS positions $\bar{l}$ | | | | | | | |
|---|---|---|---|---|---|---|---|---|
| | PUSCH mapping type A DL-DMRS-add-pos | | | | PUSCH mapping type B DL-DMRS-add-pos | | | |
| | 0 | 1 | 2 | 3 | 0 | 1 | 2 | 3 |
| 12 | $l_0$ | $l_0$, 8 | | | $l_0$ | $l_0$, 9 | | |
| 13 | $l_0$ | $l_0$, 10 | | | $l_0$ | $l_0$, 9 | | |
| 14 | $l_0$ | $l_0$, 10 | | | — | — | | |

Table 14 shows the DMRS time index and possible antenna port numbers for the single-symbol DMRS and double-symbol DMRS.

TABLE 14

PUSCH DMRS time index l' and antenna ports p

| | | Supported antenna ports p | |
|---|---|---|---|
| DM-RS duration | l' | Configuration type 1 | Configuration type 2 |
| single-symbol DM-RS | 0 | 1000-1003 | 1000-1005 |
| double-symbol DM-RS | 0, 1 | 1000-1007 | 1000-1011 |

Based on the definition of the DMRS reference point l and the DMRS position information $\bar{l}$ and l' obtained from Tables 10, 11 and 12, the DMRS reference point for the PDSCH is set by l=$\bar{l}$+l'.

Hereinabove, a description is given of the DMRS position setting method for the PUSCH (without a hop). Next, for the PUSCH (with a hop), the DMRS position can be set as follows.

DMRS position setting for PUSCH (with a hop)
First hop
 PUSCH mapping type A
  The position of the one-symbol front loaded DMRS is fixed at the 3rd or 4th symbol
  If 5 or more symbols are scheduled relative to the front-loaded DMRS, the position of the additional DMRS is at the 5th symbol relative to the front-loaded DMRS. Otherwise, no additional DMRS is used
 PUSCH mapping type B
  The position of the front-loaded DMRS is the first scheduled symbol
  If 5 or more symbols are scheduled relative to the front-loaded DMRS, the position of the additional DMRS is at the 5th symbol relative to the front-loaded DMRS. Otherwise, no additional DMRS is used
Second hop
 The position of the front-loaded DMRS is at the first symbol of the PUSCH corresponding to the second hop
 If 5 or more symbols are scheduled relative to the front-loaded DMRS corresponding to the second hop, the position of the additional DMRS is at the 5th symbol relative to the front-loaded DMRS. Otherwise, no additional DMRS is used
The same DMRS position is configured for both CP-OFDM and DFT-S-OFDM In the second embodiment, the DMRS position setting is determined according to the actually scheduled DL or UL symbol length. The DMRS information can be configured as follows. In the NR system, the DMRS-related information can be identified through the PBCH, RRC, group common DCI, and UE-specific DCI, and each signaling may include the following information.

When the position of the front-loaded DMRS is fixed at the 3rd or 4th symbol through the PBCH, receive an indication of whether the front-loaded DMRS is located at the 3rd symbol or at the 4th symbol Slot format indication (SFI) information can be configured via cell-specific RRC, and the SFI information is notified via system information (SIB2)

The SFI information may be configured and notified via UE-specific RRC

The SFI information may be dynamically configured and notified via group common DCI Some or all of the following information may be configured and received via UE specific DCI
 Information about PDSCH mapping types A and B or PUSCH mapping types A and B
 Indication of mapping type A or B
 PDSCH or PUSCH scheduling information
  Start position and duration of PDSCH or PUSCH
 Indication of DMRS port information
  Scheduled DMRS port information
  Number of CDM groups scheduled together for PDSCH rate matching
  Indication of whether front-loaded DMRS is one-symbol DMRS or two-symbol DMRS
 Frequency hopping enabling or disabling Prior to RRC setup, the DMRS configuration for PDSCH or PUSCH is subdivided as follows according to the configured SFI information and DCI scheduling information
 DMRS pattern is assumed to be DMRS-config-type 1
 In the case of slot-based scheduling, a one-symbol front-loaded DMRS and two additional DMRSs are configured by default, and for their positions, refer to PDSCH mapping type A in Table 9 (for PDSCH DMRS) and PUSCH mapping type A in Table 12 (for PUSCH DMRS).
 In the case of 2 or 4-symbol non-slot-based scheduling, only the one-symbol front-loaded DMRS is configured and no additional DMRS is configured.
 In the case of non-slot based scheduling of different symbol lengths including 7-symbol non-slot based scheduling, a single-symbol front-loaded DMRS and one single-symbol additional DMRS are configured; for their positions, refer to PDSCH mapping type B in Table 9 (for PDSCH DMRS) and PUSCH mapping type B in Table 12 (for PUSCH DMRS).
 In the case of PUSCH (with a hop), Mode 1 (intra-slot FH only) is assumed when frequency hopping is enabled by the DCI, and no additional DMRS is configured for PUSCH mapping type A and the additional DMRS is configured by default for PUSCH mapping type B.

Prior to RRC setup, PDSCH DMRS transmission is allowed only for SU-MIMO with DMRS port 0, and FDM between the PDSCH symbol and the DMRS symbol is not allowed for slot-based scheduling and 4 or 7-symbol non-slot-based scheduling. However, FDM between the PDSCH symbol and the DMRS symbol is allowed for 2-symbol non-slot-based scheduling.

Prior to RRC setup, PUSCH DMRS transmission is allowed only for SU-MIMO with DMRS port 0, and FDM between the PDSCH symbol and the DMRS symbol is not allowed.

After RRC setup, the DMRS configuration for PDSCH or PUSCH is subdivided as follows according to the DMRS information configured via RRC, configured SFI information, and DCI scheduling information DMRS information configured via RRC
    DMRS configuration type (DMRS-config-type)
        DMRS-config-type=1 or 2
    The maximum number of the front-loaded DMRS symbols (DMRS-max-len)
        DMRS-max-len=1 or 2
    The number of additional DMRS symbols (DMRS-add-pos)
        DMRS-add-pos=0,1,2,3
    Frequency hopping (FH) mode is set to one of the following:
        Mode1: intra-slot FH only
        Mode2: inter-slot FH only
    The DMRS position is determined based on the scheduling information interpreted using the DCI and the number of additional DMRSs set by RRC
        For PDSCH, refer to Tables 9 and 10
        For PUSCH (without a hop), refer to Tables 12 and 13
        For PUSCH (with a hop), refer to DMRS position setting for PUSCH (with a hop)

In the second embodiment, the DMRS information configuration is determined according to the actually scheduled UL or UL symbol length; and, unlike the method of the first embodiment, no ambiguity about the additional DMRS occurs even when the scheduled region is smaller than the PDSCH or PUSCH region. In addition, the method of the second embodiment can be used for DMRS position setting for the extended cyclic prefix (ECP). When the same DMRS configuration is used for the normal cyclic prefix (NCP) and the ECP, if the DMRS position setting method of the second embodiment is used based on the actually scheduled UL or UL symbol length, no ambiguity occurs. Specifically, one slot is composed of 14 symbols for the NCP, and one slot is composed of 12 symbols for the ECP. In the second embodiment where the DMRS position is determined according to the symbol length of the actually scheduled PDSCH or PUSCH, the DMRS position setting is described based on the NCP, but the same can be applied to the case of the ECP. For example, in FIG. 3A, among the cases indicated by c10 to c25, the cases indicated by c10 to c13 and c20 to c23 can be used for configuring the DMRS information for the ECP where the slot includes 12 symbols.

Third Embodiment

A method for configuring the DMRS information via RRC is provided in the present disclosure. Specifically, DMRS configuration parameters may vary depending on slot based scheduling or non-slot based scheduling. For example, in slot based scheduling, because the scheduled symbol length for the PDSCH or PUSCH can be up to 14 symbols, it is possible to configure the double-symbol DMRS. However, in non-slot based scheduling, it is inappropriate to configure a double-symbol DMRS when the scheduled symbol length for the PDSCH or PUSCH is 2.

Figure 5:
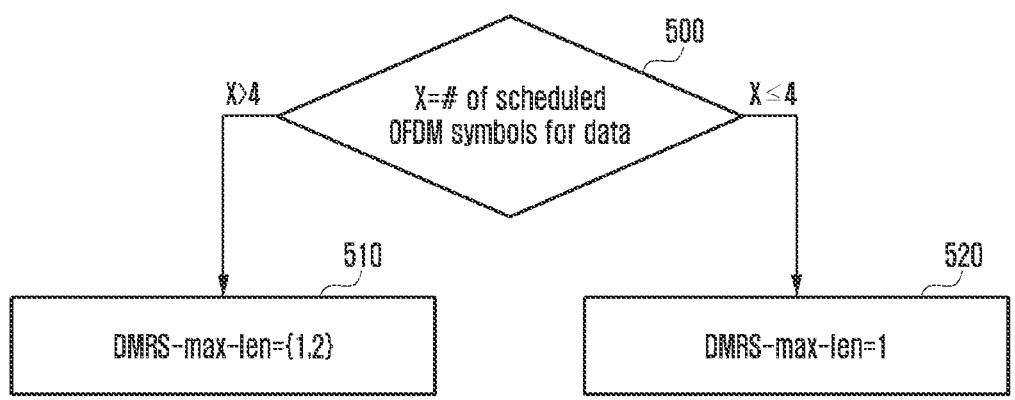
FIG. 5 is a diagram of a method for setting the number of front-loaded DMRS symbols based on the number of scheduled data symbols, according to an embodiment.

FIG. 5 is a diagram of a method for setting the number of front-loaded DMRS symbols based on the number of scheduled data symbols, according to an embodiment. As shown in FIG. 5, it is possible to set the maximum number of front-loaded DMRS symbols (DMRS-max-len), which can be set via RRC, according to the number of scheduled PDSCH or PUSCH OFDM symbols. In FIG. 5, at step 500, the threshold for the number of scheduled PDSCH or PUSCH OFDM symbols is set to 4. If the number of scheduled PDSCH or PUSCH OFDM symbols is less than or equal to 4, DMRS-max-len that can be set in RRC is set to 1 at step 520. If the number of scheduled PDSCH or PUSCH OFDM symbols is greater than 4, DMRS-max-len that can be set in RRC is set to {1, 2} at step 510. The threshold may be set to a value other than 4, but here the threshold value is proposed to be 4 in consideration of the scheduled symbol length and the DMRS overhead. In addition, DMRS patterns can be set independently for slot based scheduling and non-slot based scheduling. However, whereas the DMRS pattern configuration is set semi-statically to one of the two types (DMRS-config-type 1 or 2) through RRC, slot based scheduling or non-slot based scheduling is dynamically determined through DCI. Hence, it may be desirable to fix the DMRS patterns set in RRC according to slot-based scheduling or non-slot based scheduling. It may be possible to place a restriction on the RRC DMRS pattern setting so that if the DMRS pattern for slot-based scheduling is set to DMRS-config-type 1 in RRC, the DMRS pattern for non-slot based scheduling is also set to DMRS-config-type 1.

The following tables illustrate specific methods for setting the RRC DMRS information according to the scheduling schemes. According to the above-described third embodiment, the DMRS-related configuration can be set separately in RRC according to slot-based scheduling and non-slot based scheduling. In the RRC notation, the downlink and the uplink can be expressed as PDSCH mapping type A or PUSCH mapping type A for slot-based scheduling and as PDSCH mapping type B or PUSCH mapping type B for non-slot based scheduling. The terms for the RRC DMRS configuration information described in the following tables are defined in consideration of their functions in the present disclosure and should be construed in accordance with the spirit of the present disclosure. Table 15 below shows an example in which the DMRS-related configuration is separately described in RRC according to slot-based scheduling or non-slot based scheduling.

TABLE 15

```
-- ASN1START
DMRS-Info-slot     CHOICE{
   DMRS-config-type          INTEGER (1, 2) ,
   DMRS-max-len              INTEGER (1, 2) ,
   DMRS-add-num              INTEGER (0, 1, 2, 3) ,
}
DMRS-Info-Nonslot    CHOICE{
   DMRS-config-type          INTEGER (1, 2) ,
   DMRS-max-len-2-4-sym      INTEGER (1) ,
   DMRS-max-len-7-sym        INTEGER (1, 2) ,
   DMRS-add-num-2-4-sym      INTEGER (0) ,
   DMRS-add-num-7-sym        INTEGER (0, 1) ,
}
-- ASN1STOP
```

In Table 15, DMRS-config-type indicates the setting value for the DMRS pattern and can be restricted to have the same value for slot-based scheduling and non-slot based scheduling as described above. DMRS-max-len indicates the maximum number of front-loaded DMRS symbols and may be set to 1 or 2 for slot based scheduling. For non-slot based scheduling, DMRS-max-len may have a restriction on the value according to the scheduled symbol length as shown in Table 13. DMRS-add-num indicates the number of additional DMRSs and can be set differently according to slot-based scheduling and non-slot based scheduling. In particular, for non-slot based scheduling, DMRS-add-num may be set to one of different values depending on the number of scheduled symbols as shown in Table 15. Table 16 below shows an example in which the DMRS-related configuration is separately described in RRC according to slot-based scheduling, non-slot based scheduling, and the symbol length. The terms and settings for the DMRS configuration information in Table 16 are interpreted similarly to those in Table 15.

TABLE 16

| | |
|---|---|
| -- ASN1START | |
| DMRS-Info-slot CHOICE{ | |
| DMRS-config-type | INTEGER (1, 2) , |
| DMRS-max-len | INTEGER (1, 2) , |
| DMRS-add-num | INTEGER (0, 1, 2, 3) , |
| } | |
| DMRS-Info-Nonslot-2-4-sym | CHOICE{ |
| DMRS-config-type | INTEGER (1, 2) , |
| DMRS-max-len | INTEGER (1), |
| DMRS-add-num | INTEGER (0) , |
| } | |
| DMRS-Info-Nonslot-7-sym | CHOICE{ |
| DMRS-config-type | INTEGER (1, 2) , |
| DMRS-max-len | INTEGER (1, 2) , |
| DMRS-add-num | INTEGER (0, 1) , |
| } | |
| -- ASN1STOP | |

Table 17 below shows an example in which the DMRS-related configuration is set in RRC as a group for slot-based scheduling and non-slot based scheduling, but detailed information is set separately for slot-based scheduling and non-slot based scheduling. The terms and settings for the DMRS configuration information in Table 17 are interpreted similarly to those in Table 15.

TABLE 17

| | |
|---|---|
| -- ASN1START | |
| DMRS-Info CHOICE{ | |
| DMRS-config-type | INTEGER (1, 2) , |
| DMRS-max-len-slot | INTEGER (1, 2) , |
| DMRS-add-num-slot | INTEGER (0, 1, 2, 3), |
| DMRS-max-len-2-4-sym | INTEGER (1) , |
| DMRS-max-len-7-sym | INTEGER (1, 2) , |
| DMRS-add-num-2-4-sym | INTEGER (0) , |
| DMRS-add-num-7-sym | INTEGER (0, 1) , |
| } | |
| -- ASN1STOP | |

For ease of description, the settings in Tables 15, 16, and 17 are not subdivided for DL and UL. However, as described above, the settings in Tables 15, 16, and 17 can be separately given for DL and UL.

Fourth Embodiment

Although the number of bits required for DMRS port indication may vary according to the DMRS configuration, the fourth embodiment proposes a method of composing a DMRS port indication table to maintain the same DCI overhead. Specifically, for the DMRS port indication, the following information can be included in the DMRS port indication table.

Information about scheduled DMRS ports
Number of CDM groups for rate matching
Information about whether the DMRS pattern is a single-symbol DMRS or a double-symbol DMRS The number of bits needed to indicate the above information items may be changed according to the DMRS information settings. For example, as described in the third embodiment, in the case of non-slot based scheduling, it is inappropriate to configure a double-symbol DMRS when the scheduled PDSCH or PUSCH symbol length is 2. Hence, when the scheduled PDSCH or PUSCH symbol length is 2 or 4, as in the method proposed in the third embodiment, it is possible to restrict the maximum number of front-loaded DMRS symbols (DMRS-max-len) that can be set in RRC to take a value of 1. If DMRS-max-len is set to 2, whether the actual number of front-loaded DMRS symbols is 1 or 2 can be indicated via the DCI and the DMRS port indication table. Hence, when DMRS-max-len is set to 2, the number of bits for the DMRS port indication can be increased. More generally, the number of bits of the DMRS port indication table is determined by the DMRS pattern (DMRS-config-type 1 or 2) or the maximum number of front-loaded DMRS symbols (DMRS-max-len) set in RRC. Because DMRS-config-type 1 as a DMRS pattern supports up to 8 orthogonal DMRS ports and DMRS-config-type 2 supports up to 12 orthogonal DMRS ports, DMRS-config-type 2 requires more bits to indicate the DMRS ports than DMRS-config-type 1. Therefore, as suggested in the third embodiment, the DMRS information may be differently set in RRC for slot-based scheduling and non-slot based scheduling; and, accordingly, the number of required bits for the DMRS port indication table may be changed. As described in the third embodiment, slot-based scheduling may be interpreted as PDSCH mapping type A or PUSCH mapping type A, and non-slot based scheduling may be interpreted as PDSCH mapping type B or PUSCH mapping type B. Hence, the DMRS information configuration and the corresponding number of DMRS port indication bits may be different according to PDSCH mapping type, PUSCH mapping type, slot-based scheduling, and non-slot based scheduling. In this case, the following method can be used to make the number of DCI bits equal.

Because the scheduled DMRS port information and the number of CDM groups for rate matching are different according to the DMRS pattern, the method for making the number of DCI bits equal may first be subdivided according to the DMRS pattern.

Composing the DMRS port indication table when the DMRS pattern is set to DMRS-config-type 1.

Method 1: assuming that DMRS-max-len is set to 2, compose a DMRS port indication table with the required number of bits, and add zero padding bits to match the number of bits of the DMRS port indication table for DMRS-config-type=2 and DMRS-max-len=2

Method 2: compose each DMRS port indication table with the required number of bits for DMRS-max-len=1 and 2, and add zero padding bits to match the number of bits of the DMRS port indication table for DMRS-config-type=2 and DMRS-max-len=2

When the DMRS pattern is set to DMRS-config-type 1, in method 1, a DMRS port indication table is composed by assuming that DMRS-max-len is 2, and zero padding bits are added to match the DCI overhead of the case for DMRS-config-type=2 and DMRS-max-len=2 where the maximum number of bits is required for table composition. In method 1, if DMRS-max-len=1, the information corresponding to the double-symbol DMRS in the DMRS port indication table is not utilized.

On the other hand, in method 2, each DMRS port indication table is composed for configured DMRS-max-len, and zero padding bits are added to match the DCI overhead of the case for DMRS-config-type=2 and DMRS-max-len=2 where the maximum number of bits is required for table composition.

Composing the DMRS port indication table when the DMRS pattern is set to DMRS-config-type 2.
  Method 1: assuming that DMRS-max-len is set to 2, compose a DMRS port indication table with the required number of bits. There is no need to add zero padding bits.
  Method 2: compose each DMRS port indication table with the required number of bits for DMRS-max-len=1 and 2, and add zero padding bits to match the number of bits of the DMRS port indication table for DMRS-config-type=2 and DMRS-max-len=2

When the DMRS pattern is set to DMRS-config-type 2, in method 1, a DMRS port indication table is composed by assuming that DMRS-max-len is 2, and there is no need to add zero padding bits to match the DCI overhead because this case requires the maximum number of bits for table composition. In method 1, if DMRS-max-len=1, the information corresponding to the double-symbol DMRS in the DMRS port indication table is not utilized. On the other hand, in method 2, each DMRS port indication table is composed for configured DMRS-max-len, and zero padding bits are added to match the DCI overhead of the case for DMRS-config-type=2 and DMRS-max-len=2 where the maximum number of bits is required for table composition. In summary, although the number of bits required for DMRS port indication may vary depending on the DMRS configuration values, it is possible to prevent additional blind detection because of a change in the DCI format size when using the method of the fourth embodiment as a method for keeping the DCI overhead the same.

Fifth Embodiment

The present disclosure provides a method for determining the length of a DL or UL DMRS sequence for CP-OFDM in the NR system.

Figure 6:
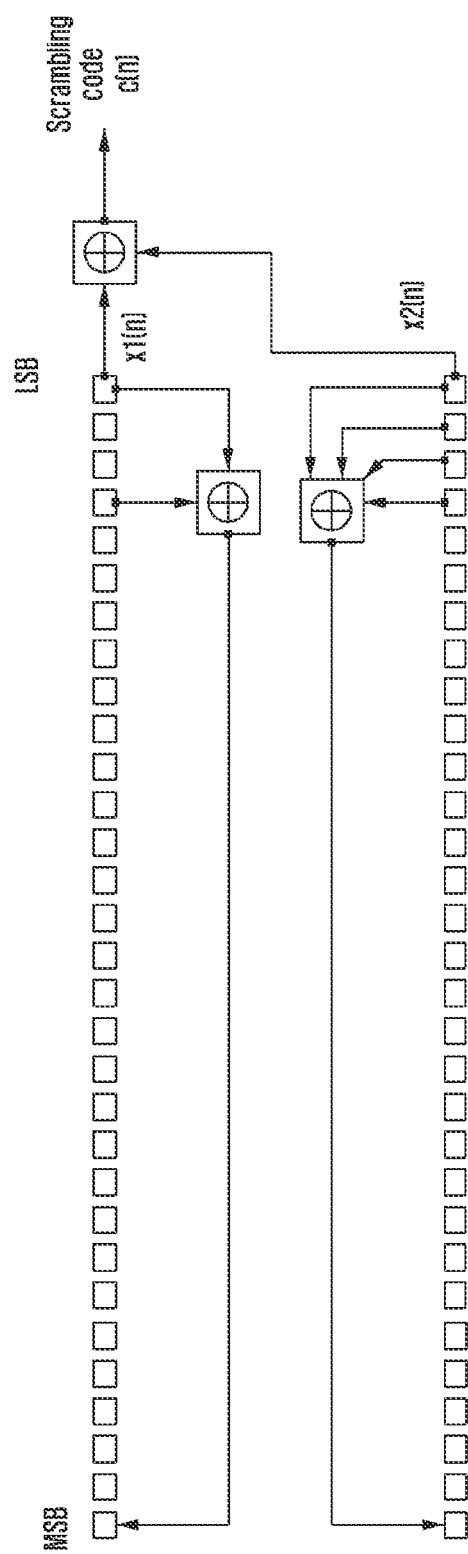
FIG. 6 is a diagram of generation of a DMRS sequence, according to an embodiment.

FIG. 6 is a diagram of generation of a DMRS sequence, according to various embodiments of the present invention. In FIG. 6, the signal is generated as a pseudo-random (PN) sequence based on a Gold sequence of length 31. More specifically, as shown in FIG. 6, the first m-sequence $x_1(n)$ generated from the polynomial $D^{31}+D^3+1$ of the upper register and the second m-sequence $x_2(n)$ generated from the polynomial $D^{31}+D^3+D^2+D+1$ of the lower register are combined to generate the PN sequence C(n). This can be represented by Equation (1) below.

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad (1)$$

Here, $N_c=1600$ and register initialization is performed as follows.
  The first m-sequence $x_1(n)$ generated by the upper register is initialized to a fixed pattern $x_1(0)=1$, $x_1(n)+0$, n=1, 2, 3, . . . , 30.
  The second m-sequence $x_2(n)$ generated by the lower register is initialized with Equation (2) according to the scrambling condition required by each signal.

$$c_{init}=\Sigma_{l=0}^{30} x_2(i) \cdot 2^i \quad (2)$$

More specifically, in the case of NR DMRS, Equation (2) is represented by Equation (3) below.

$$c_{init}=(2^{17}(14n_s+l+1)(2N_{ID}^{nSCID}+1)+2N_{ID}^{nSCID}+n_{SCID}) \bmod 2^{31} \quad (3)$$

In Equation (3), l denotes the OFDM symbol index in a slot and $n_s$ denotes the slot index. Also, $\cdot n_{SCID} \in \{0,1\}$ and $N_{ID}^{NSCID} \in \{0, 1, \ldots, 65535\}$ are given by the higher-layer parameter UL-DMRS-Scrambling-ID if provided
  $n_{SCID}=000$ and $N_{ID}^{NSCID}=N_{ID}^{cell}$ otherwise As described above, in the case of the DMRS, initialization is performed for every DMRS symbol. For DL CP-OFDM, the reference signal for transmitting the DMRS port is represented by Equation (4) below.

$$r(m) = \frac{1}{\sqrt{2}}(1-2 \cdot c(2m)) + j\frac{1}{\sqrt{2}}(1-2 \cdot c(2m+1)), \quad (4)$$

Here, for DL CP-OFDM, m is given by Equation (5) below, which depends on whether the PDSCH carries the remaining minimum system information (RMSI).

$$m = \begin{cases} 0, 1, \ldots, A \cdot N_{RB}^{initial}-1 & \text{for PDSCH transmission carring RMSI} \\ 0, 1, \ldots, A \cdot N_{CRB}^{max}-1 & \text{otherwise} \end{cases} \quad (5)$$

Here, $N_{RB}^{initial}$ indicates the number of RBs corresponding to the initial active bandwidth part for the PDSCH carrying the RMSI, and this can be interpreted as the number of RBs corresponding to the bandwidth of the control resource set (CORESET) configured in the PBCH. $N_{CRB}^{max}$ indicates the maximum number of RBs of the common resource blocks in the case of the PDSCH not carrying the RMSI and is 275 RBs in the NR system. The value of A can be set to 12 regardless of the DMRS pattern when generating different sequences for all DMRS antenna ports. When a sequence is generated based on one antenna port and the DMRS sequence is shared between different antenna ports, the value of A may be changed according to the DMRS pattern. More specifically, the DMRS sequence is initialized based on one symbol. With reference to the single-symbol DMRS of FIG. 2, for DMRS-config-type=1, one antenna port belongs to one CDM group, which occupies six REs in one RB, and the value of A can be set to 6 (A=6). For DMRS-config-type=2, one antenna port belongs to one CDM group, which occupies four REs in one RB, and the value of A can be set to 4 (A=4). On the other hand, in the case of UL CP-OFDM, m is given by Equation (6) below.

$$m=0,1, \ldots, A \cdot N_{CRB}^{max}-1 \quad (6)$$

Here, $N_{CRB}^{max}$ indicates the maximum number of RBs of the common resource blocks and is 275 RBs in the NR system.

Sixth Embodiment

The sixth embodiment proposes a method for determining the position of the start symbol for the DMRS position and scheduling. Specifically, as described in the first and second embodiments, whether PDSCH mapping type A or B is used is signaled to the terminal through the DCI. For PDSCH mapping types A and B, it is agreed that the start symbol and duration of the scheduled resources are signaled through UE-specific DCI. However, for PDSCH mapping type A, the first DMRS position is the third or fourth symbol, and whether the position of the first DMRS symbol is the third symbol or the fourth symbol is signaled through the system information transmitted via the PBCH. Hence, when scheduling is performed for PDSCH mapping type A, there is a problem that the start symbol must be located at least before the third or fourth symbol.

Three methods for solving this problem are described below.

In the first method, when the start symbol and duration for scheduling, and the signaling table and/or equation are separately specified for PDSCH mapping types A and B, settings for the signaling table and/or equation may be used. For example, if the start symbol and duration information used for scheduling and the corresponding signaling table and/or equation settings are separately specified for PDSCH mapping types A and B, the signaling table and/or equation settings can be used to solve the above problem.

Specifically, for the terminal having received a setting for PDSCH mapping type A via the DCI, if the first DMRS position set via the PBCH is the third symbol, the signaling table and/or equation for PDSCH mapping type A is configured so that the start symbol for PDSCH scheduling is not set after the fourth symbol.

For the terminal having received a setting for PDSCH mapping type A via the DCI, if the first DMRS position set via the PBCH is the fourth symbol, the signaling table and/or equation for PDSCH mapping type A is configured so that the start symbol for PDSCH scheduling is not set after the fifth symbol.

In the second method, when the start symbol and duration for scheduling, and the signaling table and/or equation are not separately specified for PDSCH mapping types A and B, it may be determined that the terminal is in a wrong state. For example, when the start symbol and duration information used for scheduling and the corresponding signaling table and/or equation settings are not separately specified for PDSCH mapping types A and B, if the above problem occurs, it may be determined that the terminal is in a wrong state.

Specifically, for a terminal having received a setting for PDSCH mapping type A via the DCI, if the first DMRS position set via the PBCH is the third symbol, the terminal does not expect the start symbol for PDSCH scheduling to be set after the fourth symbol.

For a terminal having received a setting for PDSCH mapping type A via the DCI, if the first DMRS position set via the PBCH is the fourth symbol, the terminal does not expect the start symbol for PDSCH scheduling to be set after the fifth symbol.

In the third method, the first DMRS position for PDSCH mapping type A can be changed. Specifically, for the terminal having received a setting for PDSCH mapping type A via the DCI, when the first DMRS position set via the PBCH is the third symbol, if the start symbol for PDSCH scheduling is set after the fourth symbol, the first DMRS position is located at the first scheduled symbol. For the terminal having received a setting for PDSCH mapping type A via the DCI, when the first DMRS position set via the PBCH is the fourth symbol, if the start symbol for PDSCH scheduling is set after the fifth symbol, the first DMRS position is located at the first scheduled symbol.

Although the settings for the table and/or equation are signaled through the UE-specific DCI in the above description, they may also be signaled to the terminal via RRC signaling or a MAC CE.

In the first method, settings for the signaling table and/or equation are separately specified for PDSCH mapping types A and B. The above problem can be solved through setting a signaling table and/or equation, but the signaling can become too complicated. The second method may solve the problem of the first method by causing the terminal to determine the described specific case as a wrong operation. In the third method, the first DMRS position is changed and hence an additional DMRS position may be set, increasing the implementation complexity of the terminal.

Figure 7:
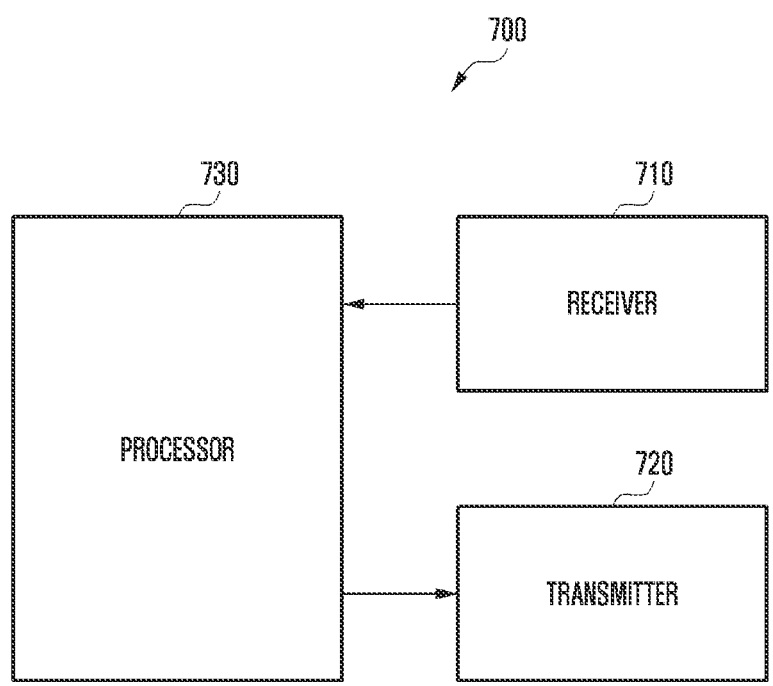
FIG. 7 is a diagram of a terminal, according to an embodiment.
Figure 8:
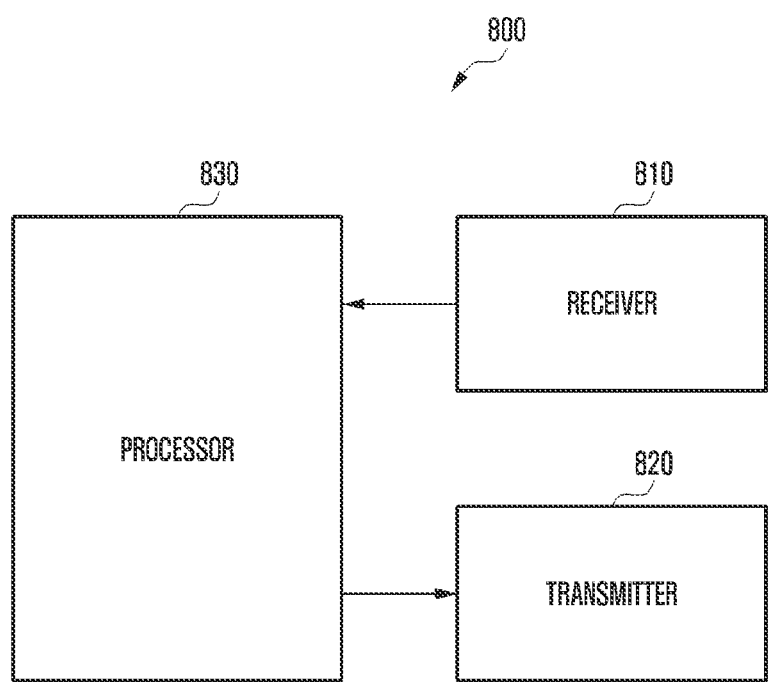
FIG. 8 is a diagram of a base station, according to an embodiment.

The terminal and the base station are shown in FIGS. 7 and 8, respectively. Each of the terminal and the base station includes a transmitter, a receiver, and a processor. The method of configuring DMRS-related information and the corresponding transmission/reception operations of the base station and the terminal are described above, and the transmitters, receivers, and processors of the base station and the terminal should operate in accordance with the embodiments.

FIG. 7 is a diagram of a terminal 700, according to an embodiment. As shown in FIG. 7, the terminal may include a receiver 710, a transmitter 720, and a processor 730. The receiver 710 and the transmitter 720 may be collectively referred to as a transceiver. The transceiver can transmit and receive signals to and from the base station. The signal may include control information and data. To this end, the transceiver may include an RF transmitter for up-converting the frequency of a signal to be transmitted and amplifying the signal and an RF receiver for low-noise amplifying a received signal and down-converting the frequency of the received signal. The transceiver may receive a signal through a wireless channel and output the signal to the processor 730, and it may transmit a signal output from the processor 730 through a wireless channel. The processor 730 may control a series of operations so that the terminal can operate as described above. For example, the processor 730 may process the DMRS-related information and transmit a signal to the base station through the transmitter 720.

FIG. 8 is a diagram of a base station 800, according to an embodiment. As shown in FIG. 8, the base station may include a receiver 810, a transmitter 820, and a processor 830. The receiver 810 and the transmitter 820 may be collectively referred to as a transceiver. The transceiver can transmit and receive signals to and from the corresponding terminal. The signal may include control information and data. To this end, the transceiver may include an RF transmitter for up-converting the frequency of a signal to be transmitted and amplifying the signal and an RF receiver for low-noise amplifying a received signal and down-converting the frequency of the received signal. The transceiver may receive a signal through a wireless channel and output the signal to the processor 830, and it may transmit a signal output from the processor 830 through a wireless channel. The processor 830 may control a series of operations so that the base station can operate as described above. For example, the receiver 810 may receive a signal from a terminal and the processor 830 may configure or determine the DMRS-related information for reception or transmission.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a terminal in a wireless communication system, the method comprising:
    receiving, from a base station, configuration information on a demodulation reference signal (DM-RS), via a radio resource control (RRC) signaling;
    receiving, from the base station, downlink control information (DCI) including scheduling information for a physical downlink shared channel (PDSCH);
    identifying first information associated with an additional DM-RS based on the configuration information;
    identifying a mapping type of the PDSCH based on the DCI;
    identifying a position of at least one DM-RS symbol based on the first information, the mapping type, a number of symbols for a DM-RS, and information on a duration in symbols; and
    receiving, from the base station, at least one DM-RS based on the position of the at least one DM-RS symbol,
    wherein the duration in symbols is determined based on PDSCH resources scheduled by the scheduling information of the DCI.

2. The method of claim 1, wherein the configuration information includes information on a maximum number of symbols for the DM-RS, and
    wherein in case that the maximum number of symbols for the DM-RS is 2, the number of symbols for the DM-RS is determined as 1 or 2 by the DCI.

3. The method of claim 2, wherein in case that the number of symbols for the DM-RS is determined as 1, the first information associated with the additional DM-RS indicates a number of the additional DM-RS as one of 0, 1, 2, or 3, and
    wherein in case that the number of symbols for the DM-RS is determined as 2, the first information associated with the additional DM-RS indicates a number of the additional DM-RS as one of 0 or 1.

4. The method of claim 1, wherein the mapping type of the PDSCH is one of a type A or a type B.

5. The method of claim 1, wherein a position of a front-loaded DM-RS is identified based on position information of the front-loaded DM-RS received on a physical broadcast channel (PBCH), depending on the mapping type of the PDSCH.

6. A method performed by a base station in a wireless communication system, the method comprising:
    transmitting, to a terminal, configuration information on a demodulation reference signal (DM-RS), via a radio resource control (RRC) signaling;
    transmitting, to the terminal, downlink control information (DCI) including scheduling information for a physical downlink shared channel (PDSCH); and
    transmitting, to the terminal, at least one DM-RS based on a position of at least one DM-RS symbol,
    wherein first information associated with an additional DM-RS is identified based on the configuration information,
    wherein a mapping type of the PDSCH is identified based on the DCI,
    wherein the position of the at least one DM-RS symbol is identified based on first information, the mapping type, a number of symbols for a DM-RS, and information on a duration in symbols, and
    wherein the duration in symbols is determined based on PDSCH resources scheduled by the scheduling information of the DCI.

7. The method of claim 6, wherein the configuration information includes information on a maximum number of symbols for the DM-RS, and
    wherein in case that the maximum number of symbols for the DM-RS is 2, the number of symbols for the DM-RS is determined as 1 or 2 by the DCI.

8. The method of claim 7, wherein in case that the number of symbols for the DM-RS is determined as 1, the first information associated with the additional DM-RS indicates a number of the additional DM-RS as one of 0, 1, 2, or 3, and
    wherein in case that the number of symbols for the DM-RS is determined as 2, the first information associated with the additional DM-RS indicates a number of the additional DM-RS as one of 0 or 1.

9. The method of claim 6, wherein the mapping type of the PDSCH is one of a type A or a type B.

10. The method of claim 1, wherein a position of a front-loaded DM-RS is identified based on position information of the front-loaded DM-RS received on a physical broadcast channel (PBCH), depending on the mapping type of the PDSCH.

11. A terminal in a wireless communication system, the terminal comprising:
a transceiver; and
a processor operably connected to the transceiver, the processor configured to:
receive, via the transceiver from a base station, configuration information on a demodulation reference signal (DM-RS), via a radio resource control (RRC) signaling,
receive, via the transceiver from the base station, downlink control information (DCI) including scheduling information for a physical downlink shared channel (PDSCH),
identify first information associated with an additional DM-RS based on the configuration information,
identify a mapping type of the PDSCH based on the DCI,
identify a position of at least one DM-RS symbol based on the first information, the mapping type, a number of symbols for a DM-RS, and information on a duration in symbols, and
receive, via the transceiver from the base station, at least one DM-RS based on the position of the at least one DM-RS symbol,
wherein the duration in symbols is determined based on PDSCH resources scheduled by the scheduling information of the DCI.

12. The terminal of claim 11, wherein the configuration information includes information on a maximum number of symbols for the DM-RS, and
wherein in case that the maximum number of symbols for the DM-RS is 2, the number of symbols for the DM-RS is determined as 1 or 2 by the DCI.

13. The terminal of claim 12, wherein in case that the number of symbols for the DM-RS is determined as 1, the first information associated with the additional DM-RS indicates a number of the additional DM-RS as one of 0, 1, 2, or 3, and
wherein in case that the number of symbols for the DM-RS is determined as 2, the first information associated with the additional DM-RS indicates a number of the additional DM-RS as one of 0 or 1.

14. The terminal of claim 11, wherein the mapping type of the PDSCH is one of a type A or a type B.

15. The terminal of claim 11, wherein a position of a front-loaded DM-RS is identified based on position information of the front-loaded DM-RS received on a physical broadcast channel (PBCH), depending on the mapping type of the PDSCH.

16. A base station in a wireless communication system, the base station comprising:
a transceiver; and
a processor operably connected to the transceiver, the processor configured to:
transmit, via the transceiver to a terminal, configuration information on a demodulation reference signal (DM-RS), via a radio resource control (RRC) signaling,
transmit, via the transceiver to the terminal, downlink control information (DCI) including scheduling information for a physical downlink shared channel (PDSCH), and
transmit, via the transceiver to the terminal, at least one DM-RS based on a position of at least one DM-RS symbol,
wherein first information associated with an additional DM-RS is identified based on the configuration information,
wherein a mapping type of the PDSCH is identified based on the DCI,
wherein the position of the at least one DM-RS symbol is identified based on first information, the mapping type, a number of symbols for a DM-RS, and information on a duration in symbols, and
wherein the duration in symbols is determined based on PDSCH resources scheduled by the scheduling information of the DCI.

17. The base station of claim 16, wherein the configuration information includes information on a maximum number of symbols for the DM-RS, and
wherein in case that the maximum number of symbols for the DM-RS is 2, the number of symbols for the DM-RS is determined as 1 or 2 by the DCI.

18. The base station of claim 17, wherein in case that the number of symbols for the DM-RS is determined as 1, the first information associated with the additional DM-RS indicates a number of the additional DM-RS as one of 0, 1, 2, or 3, and
wherein in case that the number of symbols for the DM-RS is determined as 2, the first information associated with the additional DM-RS indicates a number of the additional DM-RS as one of 0 or 1.

19. The base station of claim 16, wherein the mapping type of the PDSCH is one of a type A or a type B.

20. The base station of claim 16, wherein a position of a front-loaded DM-RS is identified based on position information of the front-loaded DM-RS received on a physical broadcast channel (PBCH), depending on the mapping type of the PDSCH.

* * * * *